United States Patent
Gomi et al.

(10) Patent No.: US 9,950,427 B2
(45) Date of Patent: Apr. 24, 2018

(54) ROBOT, CONTROL APPARATUS, AND ROBOT SYSTEM

(71) Applicant: Seiko Epson Corporation, Tokyo (JP)

(72) Inventors: Akihiro Gomi, Fujimi (JP); Shunsuke Toshimitsu, Azumino (JP)

(73) Assignee: Seiko Epson Corporation (JP)

( * ) Notice: Subject to any disclaimer, the term of this patent is extended or adjusted under 35 U.S.C. 154(b) by 99 days.

(21) Appl. No.: 15/208,950

(22) Filed: Jul. 13, 2016

(65) Prior Publication Data
US 2017/0028554 A1 Feb. 2, 2017

(30) Foreign Application Priority Data
Jul. 27, 2015 (JP) ................................ 2015-148095

(51) Int. Cl.
*G06F 19/00* (2011.01)
*B25J 9/16* (2006.01)
*B25J 13/08* (2006.01)

(52) U.S. Cl.
CPC ........... *B25J 9/1638* (2013.01); *B25J 9/1651* (2013.01); *B25J 9/1694* (2013.01); *B25J 13/088* (2013.01); *G05B 2219/37134* (2013.01); *G05B 2219/37388* (2013.01); *G05B 2219/39195* (2013.01); *G05B 2219/40597* (2013.01); *G05B 2219/41021* (2013.01); *G05B 2219/41025* (2013.01); *Y10S 901/46* (2013.01)

(58) Field of Classification Search
CPC ...... B25J 9/1638; B25J 9/1651; B25J 9/1694; B25J 13/088; G05B 2219/37134; G05B 2219/37388; G05B 2219/39195; G05B 2219/40597; G05B 2219/41021; G05B 2219/41025; Y10S 901/46

USPC ......................................................... 701/254
See application file for complete search history.

(56) References Cited

U.S. PATENT DOCUMENTS

| 7,765,023 | B2 | 7/2010 | Oaki et al. |
| 9,037,293 | B2 | 5/2015 | Gomi et al. |
| 9,533,411 | B2 * | 1/2017 | Jacobsen ................... B25J 3/04 |
| 9,789,605 | B2 * | 10/2017 | Meier ....................... B25J 9/163 |
| 2014/0060233 | A1 | 3/2014 | Gomi et al. |
| 2014/0067118 | A1 | 3/2014 | Gomi et al. |

(Continued)

FOREIGN PATENT DOCUMENTS

| JP | 2005-242794 A | 9/2005 |
| JP | 2014-046401 A | 3/2014 |

(Continued)

OTHER PUBLICATIONS

Extended European Search Report for Application No. EP 16 18 0980 dated Nov. 29, 2016 (8 pages).

*Primary Examiner* — Ronnie Mancho
(74) *Attorney, Agent, or Firm* — Harness, Dickey & Pierce, P.L.C.

(57) ABSTRACT

A robot includes a robot arm and an inertial sensor provided in the robot arm. The robot arm is controlled using a weighting value for weighting output from the inertial sensor. In at least apart of a range in which the robot arm is movable, the weighting value is a first value when acceleration of the robot arm is first acceleration, and changes from the first value to a second value higher than the first value when the acceleration of the robot arm changes from the first acceleration to second acceleration lower than the first acceleration.

20 Claims, 13 Drawing Sheets

(56) References Cited

U.S. PATENT DOCUMENTS

| 2015/0114149 A1 | 4/2015 | Gomi et al. |
| 2015/0120050 A1 | 4/2015 | Gomi et al. |
| 2015/0151432 A1 | 6/2015 | Gomi et al. |

FOREIGN PATENT DOCUMENTS

| JP | 2014-046402 A | 3/2014 |
| JP | 2014-046403 A | 3/2014 |
| JP | 2014-188643 A | 10/2014 |
| JP | 2015-085405 A | 5/2015 |
| JP | 2015-104789 A | 6/2015 |

\* cited by examiner

ROBOT, CONTROL APPARATUS, AND ROBOT SYSTEM

BACKGROUND

1. Technical Field

The present invention relates to a robot, a control apparatus, and a robot system.

2. Related Art

In related art, a robot including a pedestal (base) and a plurality of links (arms) has been known (for example, see Patent Document 1 (JP-A-2005-242794)). One link of the two adjacent links is rotatably coupled to the other link via a joint part, and the link closest to the base is rotatably coupled to the pedestal via a joint part.

In the robot, the joint part for coupling the pedestal and the link and the joint part for coupling the links have lower rigidity than the base and the links due to influences of their spring elements. Accordingly, there is a problem that vibration is easily caused in the links due to rotation of the links, disturbance on the links, or the like.

In the robot disclosed in Patent Document 1, angular velocity sensors are provided in the links and motors for rotating the links are feedback-controlled using detection values of the angular velocity sensors. Thereby, the vibration of the robot may be suppressed.

However, in the robot disclosed in Patent Document 1, there are following problems.

First, in the robot, when the arm is extended, the moment of inertia is larger and the vibration is larger, and, when the arm is folded, the moment of inertia is smaller and the vibration is smaller.

Further, when the arm is extended, the robot is harder to oscillate even when the feedback gain is raised, however, when the arm is folded, the robot is easier to oscillate.

Accordingly, in single fixed feedback gain, a vibration suppression effect may not sufficiently be obtained or oscillation is easily caused. As described above, in the robot of related art, it is impossible to sufficiently suppress the vibration.

SUMMARY

An advantage of some aspects of the invention is to solve at least a part of the problems described above, and the invention can be implemented as the following aspects or application examples.

A robot according to an aspect of the invention includes a robot arm, and an inertial sensor provided in the robot arm, wherein the robot arm is controlled using a weighting value for weighting output from the inertial sensor, and, in at least a part of a range in which the robot arm is movable, the weighting value is a first value when acceleration of the robot arm is first acceleration, and changes from the first value to a second value higher than the first value when the acceleration of the robot arm changes from the first acceleration to second acceleration lower than the first acceleration.

With this configuration, vibration of the robot may be suppressed easily and appropriately. That is, the acceleration of the robot arm, specifically, angular acceleration of an arm forming the robot arm is associated with the weighting value, the weighting value is set, and thereby, the vibration suppression effect of the robot may be easily improved.

In the robot according to the aspect of the invention, it is preferable that the robot arm is provided on a base and has a first arm rotatable about a first rotation shaft and a second arm rotatable about a second rotation shaft in an axis direction different from an axis direction of the first rotation shaft, and a maximum length between the first rotation shaft and a distal end of the robot arm is equal to or more than 970 mm.

With this configuration, a relatively large robot may be realized, and the maximum load may be increased and the movable range may be expanded.

In the robot according to the aspect of the invention, it is preferable that a mass of the robot arm is equal to or more than 30 kg.

With this configuration, a relatively large robot may be realized, and the maximum load may be increased and the movable range may be expanded.

In the robot according to the aspect of the invention, it is preferable that the maximum load provided in the robot arm exceeds 5 kg.

With this configuration, the range of choices of an end effector to be attached may be expanded and a relatively heavy object may be grasped by the end effector.

In the robot according to the aspect of the invention, it is preferable that, in at least a part of the range in which the robot arm is movable, the acceleration of the robot arm when load provided in the robot arm is equal to or more than a predetermined threshold value is lower than the acceleration of the robot arm when the load is less than the threshold value.

In the case where the load is relatively large, the robot arm is easily curved in its root and the acceleration of the robot arm, specifically, the angular acceleration of the arm forming the robot arm is reduced and the curving may be suppressed, and thereby, the vibration of the robot may be suppressed.

In the robot according to the aspect of the invention, it is preferable that the weighting value changes according to the acceleration of the robot arm.

With this configuration, the vibration suppression effect of the robot may be improved.

In the robot according to the aspect of the invention, it is preferable that the robot arm has a rotatable arm, and the acceleration of the robot arm is angular acceleration of the arm.

With this configuration, the angular acceleration of the arm is associated with the weighting value, the weighting value is set, and thereby, the vibration suppression effect of the robot may be improved.

In the robot according to the aspect of the invention, it is preferable that the robot arm has a rotatable arm, and the range in which the robot arm is movable is a range in which the arm is rotatable.

With this configuration, in at least a part of the range in which the arm is rotatable, the above described relationship is satisfied, and thereby, the vibration suppression effect of the robot may be improved.

In the robot according to the aspect of the invention, it is preferable that the robot arm is provided on a base and has a first arm rotatable about a first rotation shaft, a second arm rotatable about a second rotation shaft in an axis direction different from an axis direction of the first rotation shaft, a first reducer that decelerates driving of the first arm, and a second reducer that decelerates driving of the second arm, and rigidity of the first reducer and rigidity of the second reducer are equal to or more than 40000Nm/rad.

With this configuration, the vibration suppression effect may be effectively obtained.

A control apparatus according to an aspect of the invention controls the robot according to the aspect of the invention.

With this configuration, the vibration of the robot may be suppressed easily and appropriately. That is, the acceleration of the robot arm, specifically, angular acceleration of the arm forming the robot arm is associated with the weighting value, the weighting value is set, and thereby, the vibration suppression effect of the robot may be easily improved.

A robot system according to an aspect of the invention includes the robot according to the aspect of the invention, and a control apparatus controlling the robot.

With this configuration, the vibration of the robot may be suppressed easily and appropriately. That is, the acceleration of the robot arm, specifically, angular acceleration of the arm forming the robot arm is associated with the weighting value, the weighting value is set, and thereby, the vibration suppression effect of the robot may be easily improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot, a control apparatus, and a robot system according to the invention will be explained in detail based on an embodiment shown in the accompanying drawings.

Figure 1:
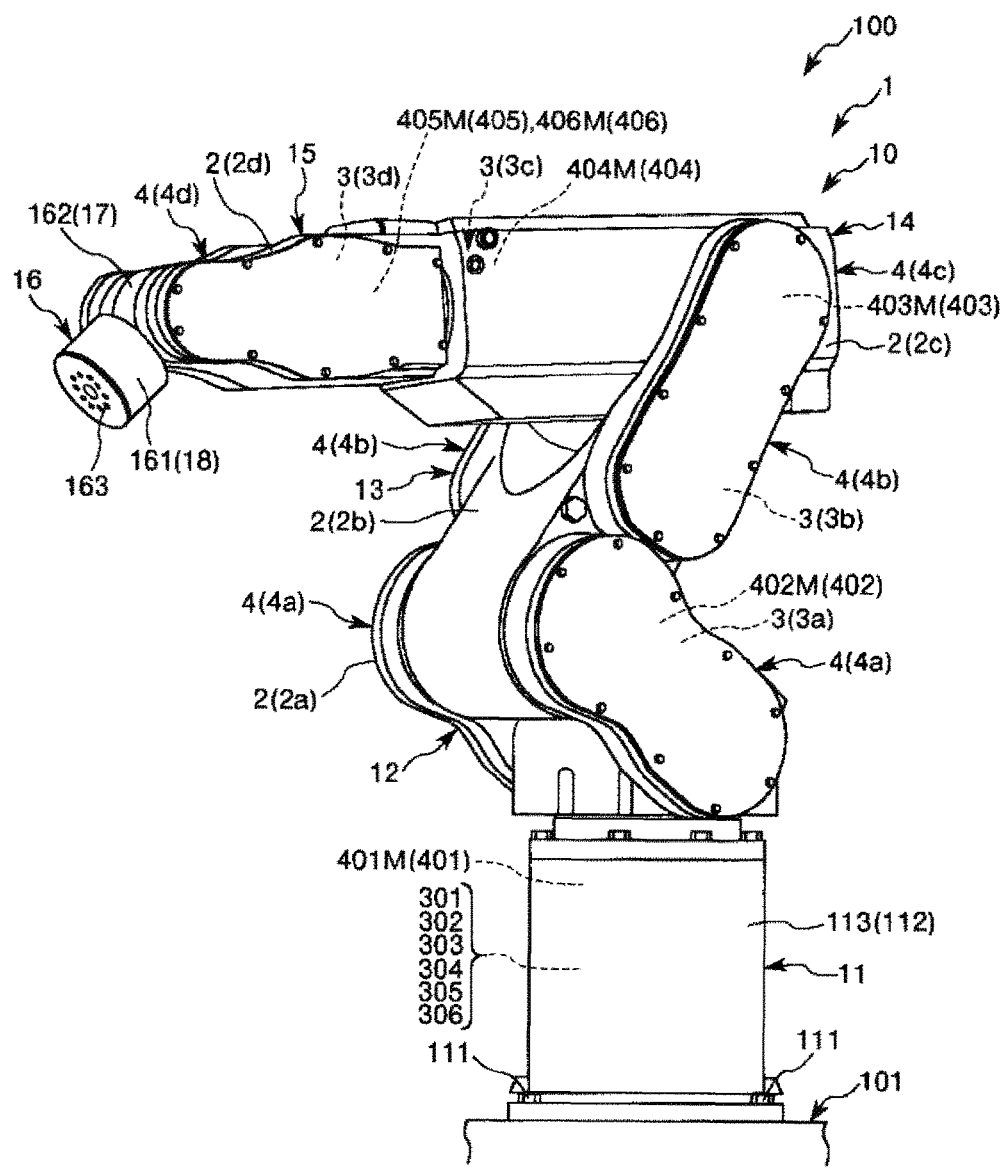
FIG. 1 is a perspective view of an embodiment of a robot of a robot system according to the invention as seen from a front side.
Figure 2:
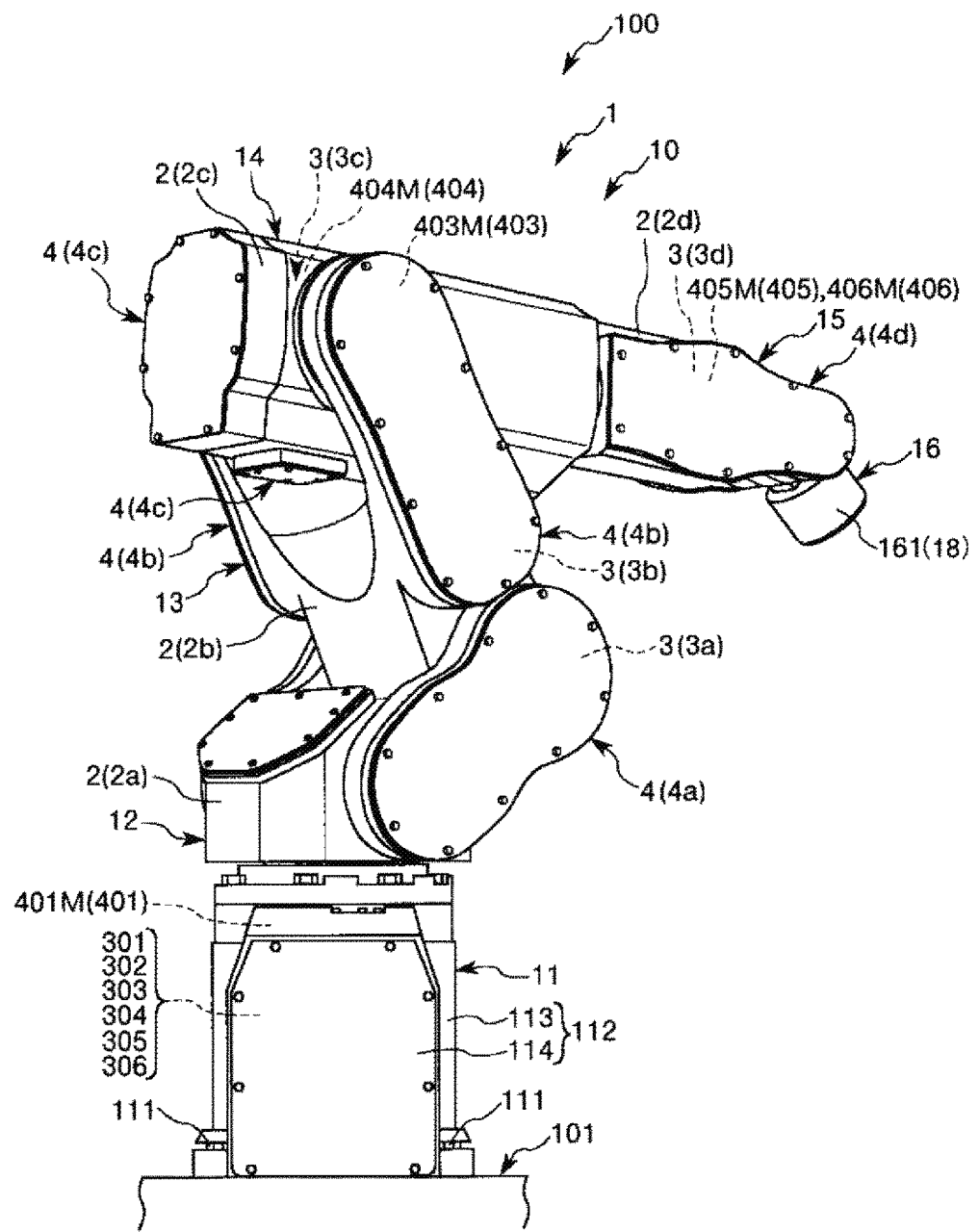
FIG. 2 is a perspective view of the robot of the robot system shown in FIG. 1 as seen from a back side.
Figure 13:
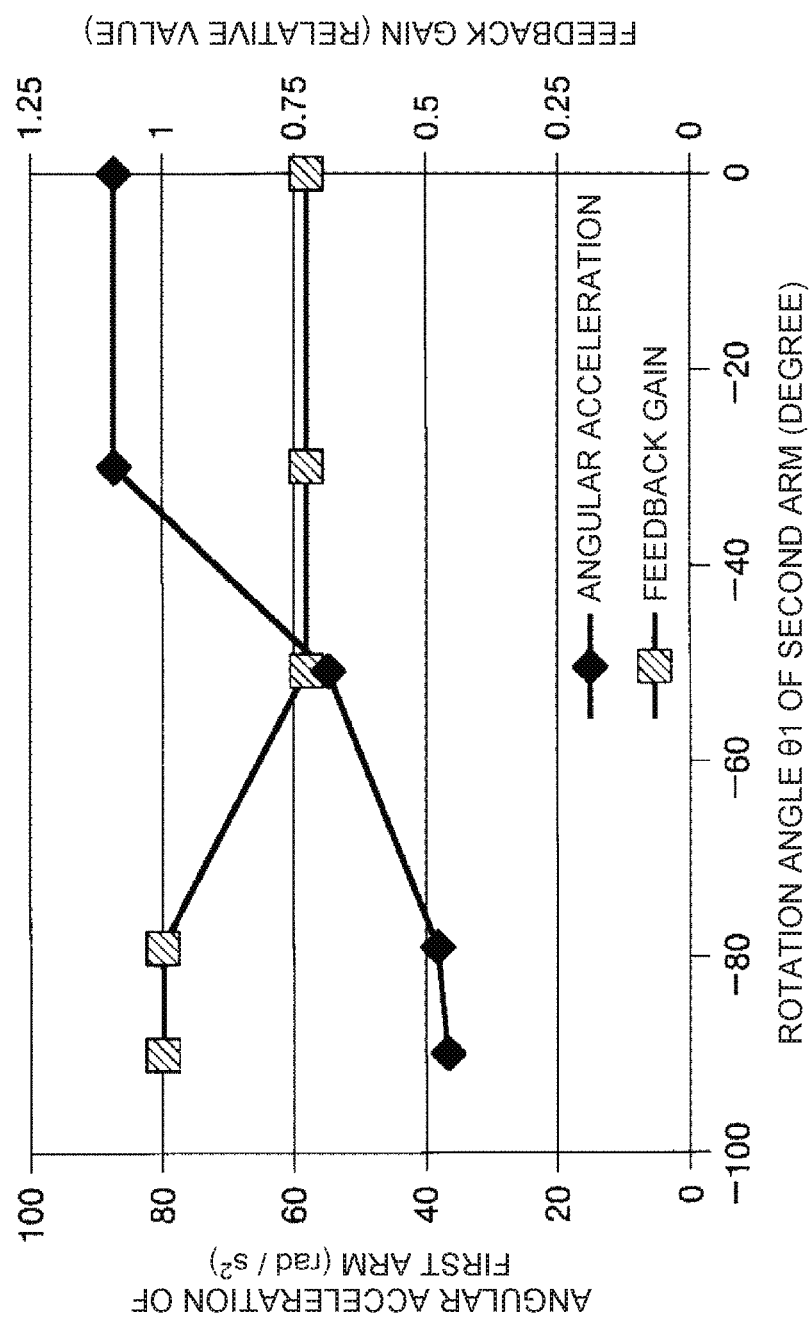
FIG. 13 is a graph showing a configuration example of calibration curves of the robot system shown in FIG. 1.
Figure 14:
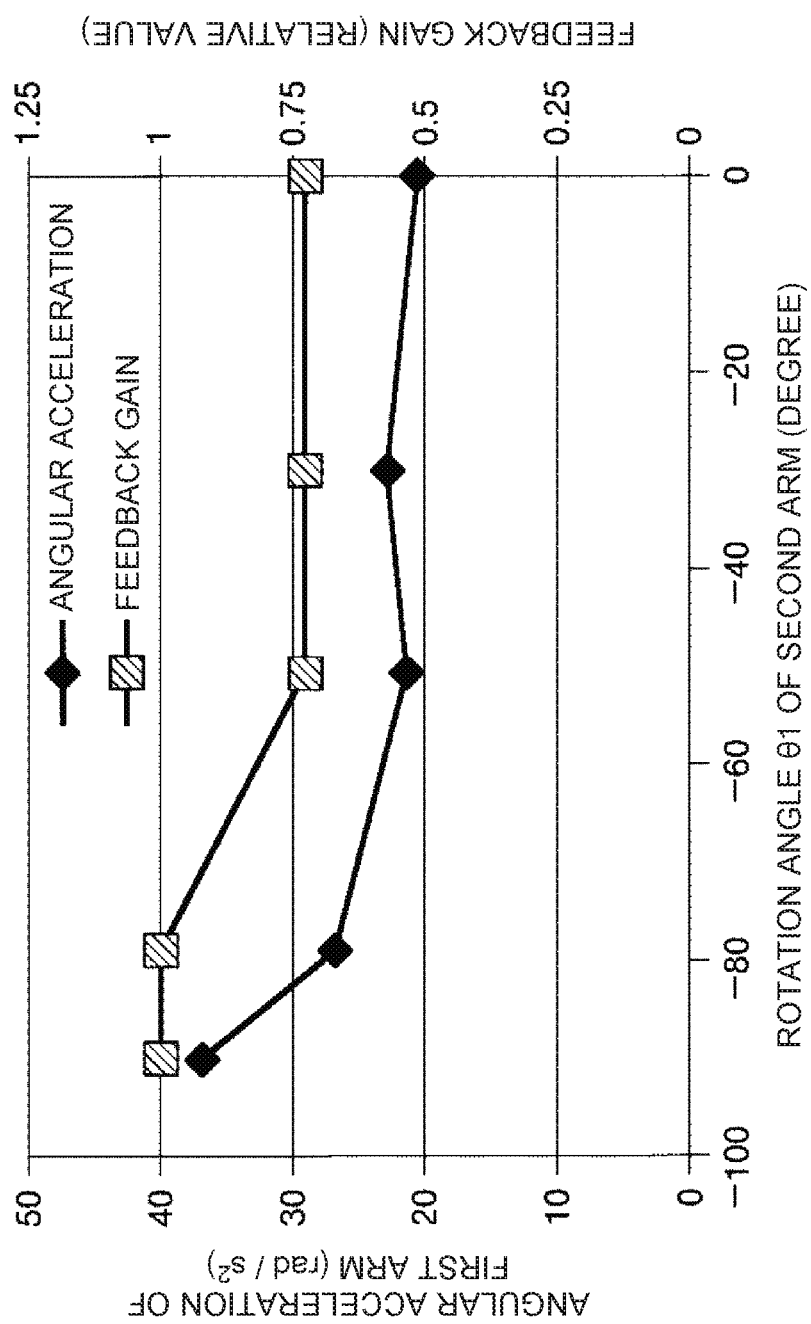
FIG. 14 is a graph showing a configuration example of calibration curves of the robot system shown in FIG. 1.
Figure 15:
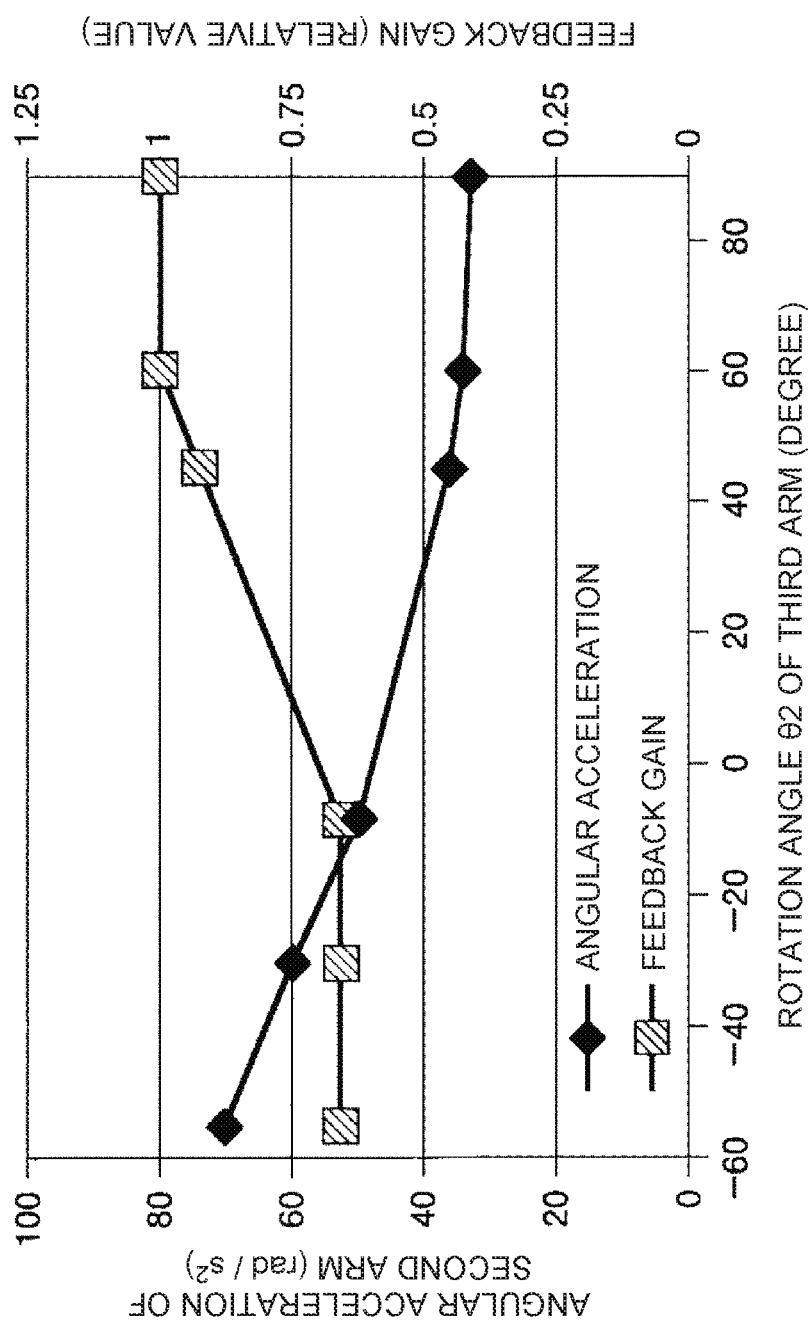
FIG. 15 is a graph showing a configuration example of calibration curves of the robot system shown in FIG. 1.

FIG. 1 is a perspective view of an embodiment of a robot of a robot system according to the invention as seen from a front side. FIG. 2 is a perspective view of the robot of the robot system shown in FIG. 1 as seen from a back side. FIGS. 3 to 6 are respectively schematic diagrams of the robot of the robot system shown in FIG. 1. FIGS. 7 to 12 are respectively block diagrams of main parts of the robot system shown in FIG. 1. FIGS. 13 to 15 are respectively graphs showing configuration examples of calibration curves of the robot system shown in FIG. 1.

Note that, hereinafter, for convenience of explanation, the upside in FIGS. 1 to 6 is referred to as "up" or "upper" and the downside is referred to as "down" or "lower". Further, the base side in FIGS. 1 to 6 is referred to as "proximal end" and the opposite side is referred to as "distal end".

A robot system (industrial robot system) 100 shown in FIGS. 1 to 7 includes a robot (industrial robot) 1 and a control apparatus (control unit) 20 that controls operation (driving) of the robot 1. The robot system 100 may be used in e.g. a manufacturing process of manufacturing precision apparatuses such as wristwatches or the like. The control apparatus 20 may be built in the robot 1 or separately provided from the robot 1. Further, the control apparatus 20 may be formed using e.g. a personal computer (PC) containing a CPU (Central Processing Unit) or the like.

The robot 1 includes a base (supporting part) 11 and a robot arm 10. The robot arm 10 includes a first arm (first arm member) (arm part) 12, a second arm (second arm member) (arm part) 13, a third arm (third arm member) (arm part) 14, a fourth arm (fourth arm member) (arm part) 15, a fifth arm (fifth arm member) (arm part) 17, and a sixth arm (sixth arm member) (arm part) 18 (six arms), and a first drive source (first drive part) 401, a second drive source (second drive part) 402, a third drive source (third drive part) 403, a fourth drive source (fourth drive part) 404, a fifth drive source (fifth drive part) 405, and a sixth drive source (sixth drive part) 406 (six drive sources). A wrist 16 is formed by the fifth arm 17 and the sixth arm 18, and, for example, an end effector (not shown) or the like may be detachably attached to the distal end of the sixth arm 18, i.e., the distal end of the wrist 16.

The robot 1 is a vertical articulated (six-axis) robot in which the base 11, the first arm 12, the second arm 13, the third arm 14, the fourth arm 15, the fifth arm 17, and the sixth arm 18 are sequentially coupled from the proximal end side toward the distal end side. As below, the first arm 12, the second arm 13, the third arm 14, the fourth arm 15, the fifth arm 17, and the sixth arm 18 will be respectively also referred to as "arm". The first drive source 401, the second drive source 402, the third drive source 403, the fourth drive source 404, the fifth drive source 405, and the sixth drive source 406 will be respectively also referred to as "drive source (drive unit)".

Figure 3:
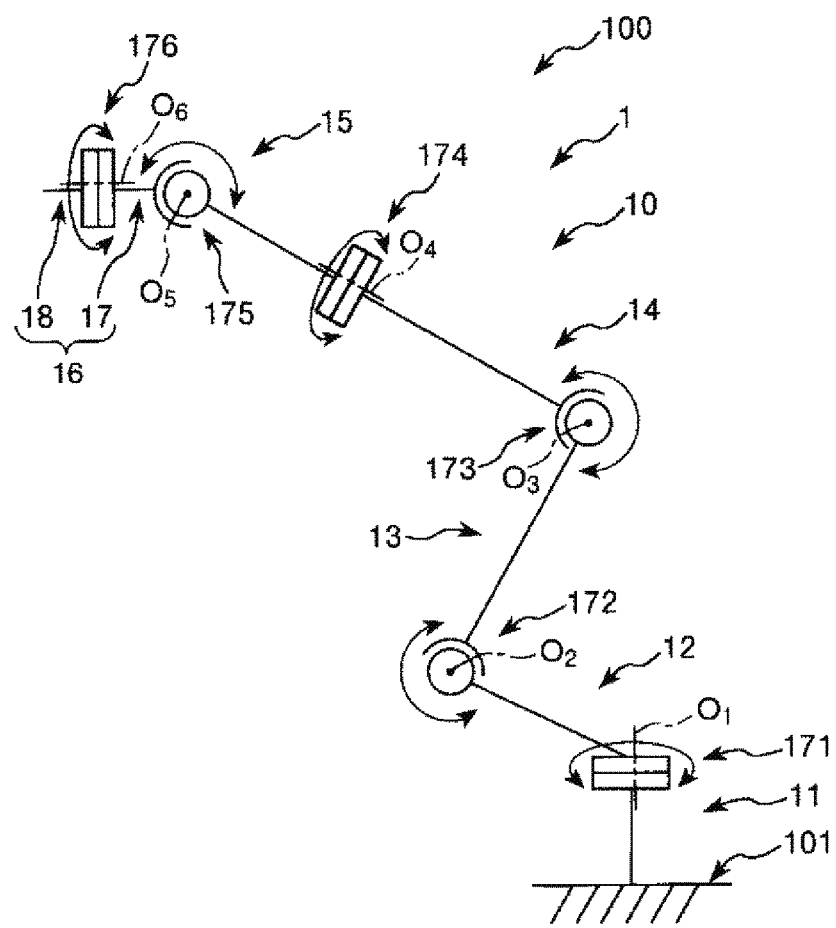
FIG. 3 is a schematic diagram of the robot of the robot system shown in FIG. 1.
Figure 4:
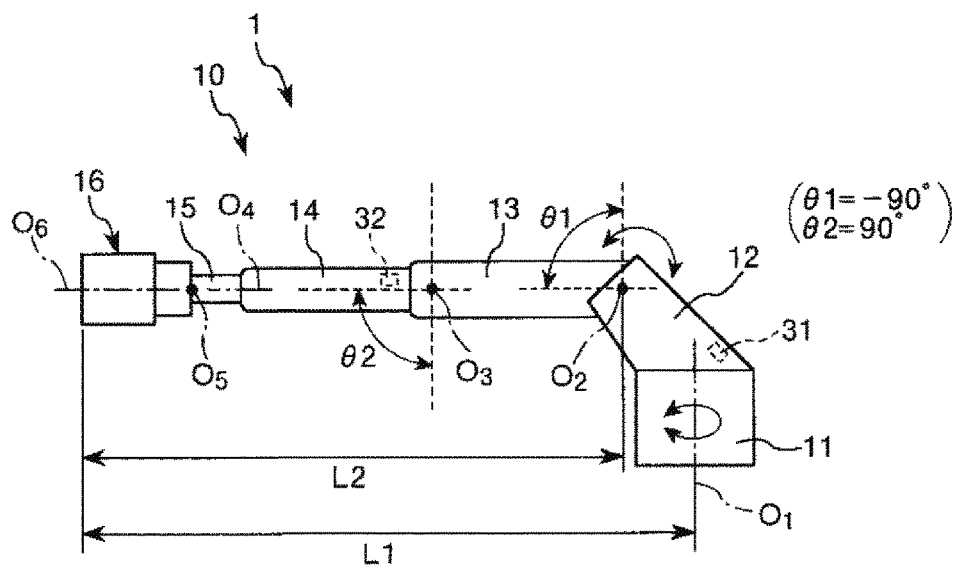
FIG. 4 is a schematic diagram of the robot of the robot system shown in FIG. 1.

As shown in FIGS. 3 and 4, the arms 12 to 15 and the wrist 16 are respectively supported to be independently displaceable with respect to the base 11. The respective lengths of the arms 12 to 15 and the wrist 16 are not particularly limited, but the lengths of the arms 12 to 14 are set to be longer than the other arm 15 and the wrist 16 in the illustrated configuration. Note that, for example, the length of the third arm 14 may be made shorter than the lengths of the first arm 12 and the second arm 13.

The base 11 and the first arm 12 are coupled via a joint 171. The first arm 12 is rotatable around a first rotation shaft O1 in parallel to the vertical direction about the first rotation shaft O1 with respect to the base 11. The first rotation shaft O1 is aligned with a normal of an upper surface of a floor 101 as an installation surface of the base 11. Further, the first rotation shaft O1 is a rotation shaft on the most upstream side of the robot 1. The rotation about the first rotation shaft O1 (driving of the first arm 12) is performed by driving of the first drive source 401 having a motor (first motor) 401M and a reducer (not shown). The first drive source 401 is driven by the motor 401M and a cable (not shown), and the motor 401M is controlled by the control apparatus 20 via a motor driver 301 electrically connected thereto. Note that the reducer may be omitted.

The first arm 12 and the second arm 13 are coupled via a joint 172. The second arm 13 is rotatable around a second rotation shaft O2 in parallel to the horizontal direction about the second rotation shaft O2 with respect to the first arm 12. The second rotation shaft O2 is orthogonal to the first rotation shaft O1. The rotation about the second rotation shaft O2 (driving of the second arm 13) is performed by driving of the second drive source 402 having a motor (second motor) 402M and a reducer (not shown). The second drive source 402 is driven by the motor 402M and a cable (not shown), and the motor 402M is controlled by the control apparatus 20 via a motor driver 302 electrically connected thereto. Note that the reducer may be omitted. Further, the rotation shaft O2 may be parallel to an axis orthogonal to the rotation shaft O1.

The second arm 13 and the third arm 14 are coupled via a joint 173. The third arm 14 is rotatable around a third rotation shaft O3 in parallel to the horizontal direction about the third rotation shaft O3 with respect to the second arm 13. The third rotation shaft O3 is parallel to the second rotation shaft O2. The rotation about the third rotation shaft O3 (driving of the third arm 14) is performed by driving of the third drive source 403 having a motor (third motor) 403M and a reducer (not shown). The third drive source 403 is driven by the motor 403M and a cable (not shown), and the motor 403M is controlled by the control apparatus 20 via a motor driver 303 electrically connected thereto. Note that the reducer may be omitted.

The third arm 14 and the fourth arm 15 are coupled via a joint 174. The fourth arm 15 is rotatable around a fourth rotation shaft O4 in parallel to the center axis direction of the third arm 14 about the fourth rotation shaft O4 with respect to the third arm 14 (base 11). The fourth rotation shaft O4 is orthogonal to the third rotation shaft O3. The rotation about the fourth rotation shaft O4 (driving of the fourth arm 15) is performed by driving of the fourth drive source 404 having a motor (fourth motor) 404M and a reducer (not shown). The fourth drive source 404 is driven by the motor 404M and a cable (not shown), and the motor 404M is controlled by the control apparatus 20 via a motor driver 304 electrically connected thereto. Note that the reducer may be omitted. Further, the fourth rotation shaft O4 may be parallel to an axis orthogonal to the third rotation shaft O3.

The fourth arm 15 and the fifth arm 17 of the wrist 16 are coupled via a joint 175. The fifth arm 17 is rotatable around a fifth rotation shaft O5 about the fifth rotation shaft O5 with respect to the fourth arm 15. The fifth rotation shaft O5 is orthogonal to the fourth rotation shaft O4. The rotation about the fifth rotation shaft O5 (driving of the fifth arm 17) is performed by driving of the fifth drive source 405 having a motor (fifth motor) 405M and a reducer (not shown). The fifth drive source 405 is driven by the motor 405M and a cable (not shown), and the motor 405M is controlled by the control apparatus 20 via a motor driver 305 electrically connected thereto. Note that the reducer may be omitted. Further, the fifth rotation shaft O5 may be parallel to an axis orthogonal to the fourth rotation shaft O4.

The fifth arm 17 and the sixth arm 18 of the wrist 16 are coupled via a joint 176. The sixth arm 18 is rotatable around a sixth rotation shaft O6 about the sixth rotation shaft O6 with respect to the fifth arm 17. The rotation shaft O6 is orthogonal to the rotation shaft O5. The rotation about the sixth rotation shaft O6 (driving of the sixth arm 18) is performed by driving of the sixth drive source 406 having a motor (sixth motor) 406M and a reducer (not shown). The sixth drive source 406 is driven by the motor 406M and a cable (not shown), and the motor 406M is controlled by the control apparatus 20 via a motor driver 306 electrically connected thereto. Note that the reducer may be omitted. Further, the sixth rotation shaft O6 may be parallel to an axis orthogonal to the fifth rotation shaft O5.

Further, in the first arm 12, a first inertial sensor 31 is provided (see FIG. 4). The angular velocity of the first arm 12 (e.g. the angular velocity about the first rotation shaft O1 or the like) can be detected by the first inertial sensor 31. The position in which the first inertial sensor 31 is provided in the first arm 12 is not particularly limited. In the embodiment, the first inertial sensor 31 is provided in the proximal end part of the first arm 12. Note that the first inertial sensor 31 may be provided in the distal end part of the first arm 12, for example. The vibration of the first arm 12 becomes the maximum in the distal end part, and thereby, the vibration of the robot 1 may be suppressed more reliably.

Further, in the third arm 14, a second inertial sensor 32 is provided (see FIG. 4). The angular velocity of the third arm 14 (e.g. the angular velocity about the second rotation shaft O2 or the like) can be detected by the second inertial sensor 32. The position in which the second inertial sensor 32 is provided in the third arm 14 is not particularly limited. In the embodiment, the second inertial sensor 32 is provided in the proximal end part of the third arm 14. Note that the second inertial sensor 32 may be provided in the distal end part of the third arm 14, for example. The vibration of the third arm 14 becomes the maximum in the distal end part, and thereby, the vibration of the robot 1 may be suppressed more reliably. The second inertial sensor 32 may be provided in the second arm 13, for example, not limited in the third arm 14.

The first inertial sensor 31 and the second inertial sensor 32 are respectively not particularly limited. In the embodiment, for example, angular velocity sensors (gyro sensors) or the like may be used.

Here, in the robot 1, the vibrations of the arms 12, 13, and 14 are suppressed, and thereby, the vibration of the whole robot 1 is suppressed. Note that the inertial sensors are provided in not all of the arms 12, 13, and 14 for suppressing the vibrations of the arms 12, 13, and 14, but the first inertial sensor 31 and the second inertial sensor 32 are provided only in the arms 12 and 14 as described above and the operations of the drive sources 401, 402 are controlled based on the detection results of the first inertial sensor 31 and the second inertial sensor 32. Thereby, compared to the case where the inertial sensors are provided in all of the arms 12, 13, and 14, the number of inertial sensors may be reduced, the cost may be reduced, and the circuit configuration may be simplified.

In the drive sources 401 to 406, a first angle sensor 411, a second angle sensor 412, a third angle sensor 413, a fourth angle sensor 414, a fifth angle sensor 415, a sixth angle sensor 416 are provided in the respective motors or reducers. As these angle sensors, e.g. encoders, rotary encoders, or the like may be used. By the angle sensors 411 to 416, rotation angles (rotating angles) of rotation axes (rotating axes) of the motors or the reducers of the drive sources 401 to 406 are detected, respectively. The motors of the drive sources 401 to 406 are respectively not particularly limited. For example, servo motors such as AC servo motors or DC servo motors may be preferably used. Further, the respective above described cables may be respectively inserted through the robot 1.

Figure 7:
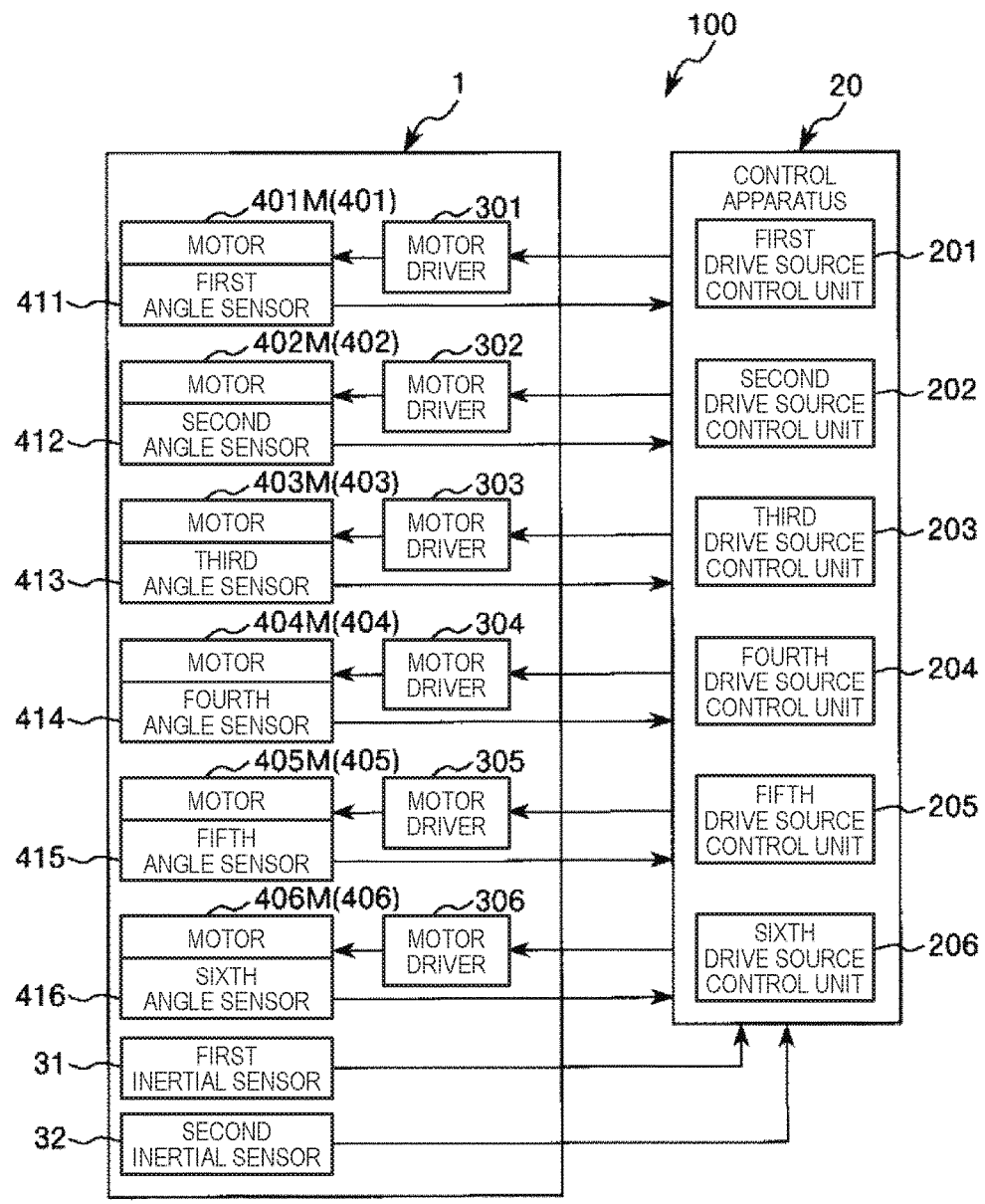
FIG. 7 is a block diagram of a main part of the robot system shown in FIG. 1.

As shown in FIG. 7, the robot 1 is electrically connected to the control apparatus 20. That is, the drive sources 401 to 406, the angle sensors 411 to 416, and the inertial sensors 31, 32 are respectively electrically connected to the control apparatus 20.

Further, the control apparatus 20 may respectively independently operate the arms 12 to 15 and the wrist 16, in other words, may respectively independently control the drive sources 401 to 406 via the motor drivers 301 to 306. In this case, the control apparatus 20 performs detection using the angle sensors 411 to 416, the first inertial sensor 31, and the second inertial sensor 32 and respectively controls driving of the drive sources 401 to 406, e.g. angular velocities, rotation angles, or the like based on their detection results. The control program is stored in advance in a recording medium (memory unit) built in the control apparatus 20.

As shown in FIGS. 1 and 2, in the embodiment, the base 11 is a part located at the lowermost side in the vertical direction of the robot 1 and to be fixed (installed) on the floor (floor part) 101 of the installation space. The fixing method is not particularly limited, but e.g. a fixing method using a plurality of bolts 111 is employed in the embodiment shown in FIGS. 1 and 2.

The base 11 has a hollow base main body (housing) 112. The base main body 112 may be divided into a cylindrical part 113 having a cylindrical shape and a box-shaped part 114 having a box shape integrally formed in the outer circumferential portion of the cylindrical part 113. Further, in the base main body 112, e.g. the motor 401M and the motor drivers 301 to 306 are housed.

The arms 12 to 15 each has a hollow arm main body 2, a drive mechanism 3, and a sealing unit 4. Hereinafter, for convenience of explanation, the arm main body 2, the drive mechanism 3, and the sealing unit 4 of the first arm 12 may be referred to as "arm main body 2a", "drive mechanism 3a", and "sealing unit 4a", respectively, the arm main body 2, the drive mechanism 3, and the sealing unit 4 of the second arm 13 may be referred to as "arm main body 2b", "drive mechanism 3b", and "sealing unit 4b", respectively, the arm main body 2, the drive mechanism 3, and the sealing unit 4 of the third arm 14 may be referred to as "arm main body 2c", "drive mechanism 3c", and "sealing unit 4c", respectively, and the arm main body 2, the drive mechanism 3, and the sealing unit 4 of the fourth arm 15 may be referred to as "arm main body 2d", "drive mechanism 3d", and "sealing unit 4d", respectively.

Further, the joints 171 to 176 each has a rotation support mechanism (not shown). The rotation support mechanisms include mechanisms that rotatably support one of the two arms coupled to each other with respect to the other and a mechanism that rotatably supports one of the base 11 and the first arm 12 coupled to each other with respect to the other. In the case where the fourth arm 15 and the fifth arm 17 of the wrist 16 coupled to each other are taken as an example, the rotation support mechanism may rotate the wrist 16 with respect to the fourth arm 15. The respective rotation support mechanisms respectively have reducers (not shown) that reduce rotation speeds of the corresponding motors at predetermined reduction ratios and transmit their drive power to the corresponding arms, a wrist main body 161 of the wrist 16, and a supporting ring 162.

The first arm 12 is coupled to the upper end part (distal end part) of the base 11 in an attitude inclined with respect to the horizontal direction. In the first arm 12, the drive mechanism 3a has the motor 402M and houses the motor within the arm main body 2a. The interior of the arm main body 2a is air-tightly sealed by the sealing unit 4a.

The second arm 13 is coupled to the distal end part of the first arm 12. In the second arm 13, the drive mechanism 3b has the motor 403M and houses the motor within the arm main body 2b. The interior of the arm main body 2b is air-tightly sealed by the sealing unit 4b.

The third arm 14 is coupled to the distal end part of the second arm 13. In the third arm 14, the drive mechanism 3c has the motor 404M and houses the motor within the arm main body 2c. The interior of the arm main body 2c is air-tightly sealed by the sealing unit 4c.

The fourth arm 15 is coupled to the distal end part of the third arm 14 in parallel to the center axis direction thereof. In the arm 15, the drive mechanism 3d has the motors 405M, 406M and houses the motors within the arm main body 2d. The interior of the arm main body 2d is air-tightly sealed by the sealing unit 4d.

The wrist 16 is coupled to the distal end part (the opposite end part to the base 11) of the fourth arm 15. To the wrist 16, e.g. an end effector or the like is detachably attached to the distal end part (the opposite end part to the fourth arm 15) thereof.

The end effector includes, but not particularly limited to, e.g. a hand (not shown) or the like that grasps a precision apparatus such as a wristwatch, apart, or the like. The driving of the hand (end effector) is controlled by a control apparatus 20. The hand includes, but not particularly limited to, e.g. a hand having a plurality of fingers. The robot 1 controls the motions of the arms 12 to 15, the wrist 16, etc. while grasping a precision apparatus, a part, or the like with the hand, and thereby, may perform respective work of carrying the precision apparatus, the part, or the like.

The wrist 16 has the wrist main body 161 having a cylindrical shape as the sixth arm 18 and the supporting ring 162 formed separately from the wrist main body 161, provided in the proximal end part of the wrist main body 161, and having a ring shape as the fifth arm 17.

A distal end surface 163 of the wrist main body 161 is a flat surface and serves as an attachment surface to which the hand is attached. Further, the wrist main body 161 is coupled to the drive mechanism 3d of the fourth arm 15 via the joint 176, and rotates about the rotation shaft O6 by driving of the motor 406M of the drive mechanism 3d.

The supporting ring 162 is coupled to the drive mechanism 3d of the fourth arm 15 via the joint 175, and rotates about the rotation shaft O5 integrally with the wrist main body 161 by driving of the motor 405M of the drive mechanism 3d.

The respective dimensions, the respective characteristics, the respective performances, etc. of the robot 1 are not particularly limited, but appropriately set according to various conditions. The maximum length L1 between the first rotation shaft O1 and the distal end of the robot arm 10 (wrist 16) is preferably 970 mm or more, more preferably from 970 mm to 3000 mm, and even more preferably from 970 mm to 2000 mm.

As shown in FIG. 4, the maximum length L1 is a length between the first rotation shaft O1 and the distal end of the robot arm 10 in a condition in which the second arm 13 to the wrist 16 are linearly extended in the horizontal direction (the direction perpendicular to the first rotation shaft O1) to the right side in FIG. 4.

Further, the maximum length L2 between the second rotation shaft O2 and the distal end of the robot arm 10 is preferably 870 mm or more, more preferably from 870 mm to 2800 mm, and even more preferably from 870 mm to 1800 mm.

As shown in FIG. 4, the maximum length L2 is a length between the second rotation shaft O2 and the distal end of the robot arm 10 in a condition in which the second arm 13 to the wrist 16 are linearly extended.

A total mass of the first arm 12 to the fourth arm 15 and the wrist 16, i.e., a mass M1 of the robot arm 10 is preferably 30 kg or more, more preferably from 30 kg to 200 kg, and even more preferably from 30 kg to 100 kg.

Further, a total mass M2 of the second arm 13 to the fourth arm 15 and the wrist 16 is preferably 20 kg or more, more preferably from 20 kg to 150 kg, and even more preferably from 20 kg to 80 kg.

The maximum load (weight capacity) provided in the robot arm 10 is preferably 5 kg or more, more preferably from 5 kg to 50 kg, and even more preferably from 5 kg to 20 kg.

The rated load provided in the robot arm 10 is preferably 2 kg or more, more preferably from 2 kg to 20 kg, and even more preferably from 2 kg to 10 kg.

Note that the maximum load and the rated load are respectively load on the distal end part of the wrist 16 and include the mass of the end effector.

The moment of inertia (the maximum value of the moment of inertia) with respect to the first rotation shaft O1 (about the first rotation shaft O1 as a rotation center axis) of the robot arm 10 in the attitude shown in FIG. 4 is preferably 7.0 kg·m$^2$ or more, more preferably from 7.0 kg·m$^2$ to 70.0 kg·m$^2$, and even more preferably from 8.5 kg·m$^2$ to 50.0 kg·m$^2$.

Further, the moment of inertia (the maximum value of the moment of inertia) with respect to the second rotation shaft O2 (about the second rotation shaft O2 as a rotation center axis) of the robot arm 10 in the attitude shown in FIG. 4 is preferably 5.0 kg·m$^2$ or more, more preferably from 5.0 kg·m$^2$ to 50.0 kg·m$^2$, and even more preferably from 6.0 kg·m$^2$ to 40.0 kg·m$^2$.

Furthermore, if the cycle time is measured when the load on the distal end part of the wrist 16 is set to 2 kg, the cycle time is preferably 0.40 seconds or less, more preferably from 0.05 seconds to 0.40 seconds, and even more preferably from 0.10 seconds to 0.38 seconds. If the cycle time is measured when the load is set to 5 kg, the cycle time is preferably 0.70 seconds or less, more preferably from 0.10 seconds to 0.70 seconds, and even more preferably from 0.15 seconds to 0.68 seconds.

The above described conditions are satisfied, and thereby, the effect of suppressing the vibration of the robot 1 (vibration suppression effect) may be further improved by adjustment of feedback gain and angular acceleration as will be described later.

Further, rigidity (spring constant) of the first reducer that decelerates driving of the first arm 12 and rigidity (spring constant) of the second reducer that decelerates driving of the second arm 13 are preferably 40000 Nm/rad or more, more preferably from 40000Nm/rad to 400000 Nm/rad, and even more preferably from 60000Nm/rad to 200000 Nm/rad. Here, the rigidity (spring constant) of the reducer is defined by T/θ from a torsion angle θ (rad) on the output side of the reducer when the input side (motor side) of the reducer is fixed and torque T (Nm) is applied to the output side (arm side).

Thereby, the vibration suppression effect (damping effect) may be effectively obtained.

Conversely, when the weight capacity of the robot 1 is larger, the sufficient vibration suppression effect is not obtained without rigidity of the reducer to some extent. That is, when the weight capacity is larger, if the damping control (torsion angular velocity correction) using the feedback control (gyro servo) to be described later is performed on the reducer having rigidity equal to or more than 40000 Nm/rad, the especially great vibration suppression effect may be obtained.

Next, referring to FIGS. 7 and 8 to 12, the configuration of the control apparatus 20 will be explained.

As shown in FIGS. 7 and 8 to 12, the control apparatus 20 has a first drive source control unit 201 that controls the operation (driving) of the first drive source 401, a second drive source control unit 202 that controls the operation of the second drive source 402, a third drive source control unit 203 that controls the operation of the third drive source 403, a fourth drive source control unit 204 that controls the operation of the fourth drive source 404, a fifth drive source control unit 205 that controls the operation of the fifth drive source 405, and a sixth drive source control unit 206 that controls the operation of the sixth drive source 406.

Figure 8:
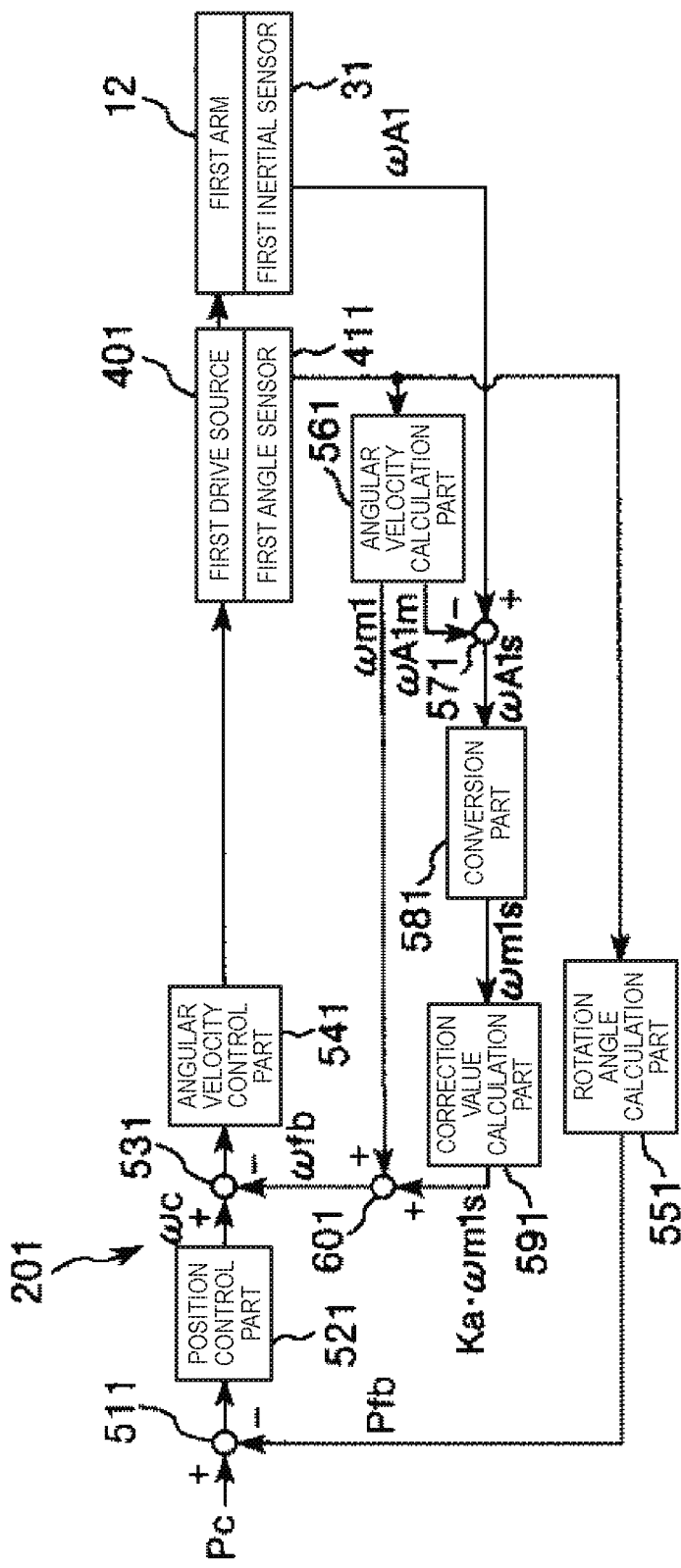
FIG. 8 is a block diagram of a main part of the robot system shown in FIG. 1.

As shown in FIG. 8, the first drive source control unit 201 has a subtractor 511, a position control part 521, a subtractor 531, an angular velocity control part 541, a rotation angle calculation part 551, an angular velocity calculation part 561, a subtractor 571, a conversion part 581, a correction value calculation part 591, and an adder 601.

Figure 9:
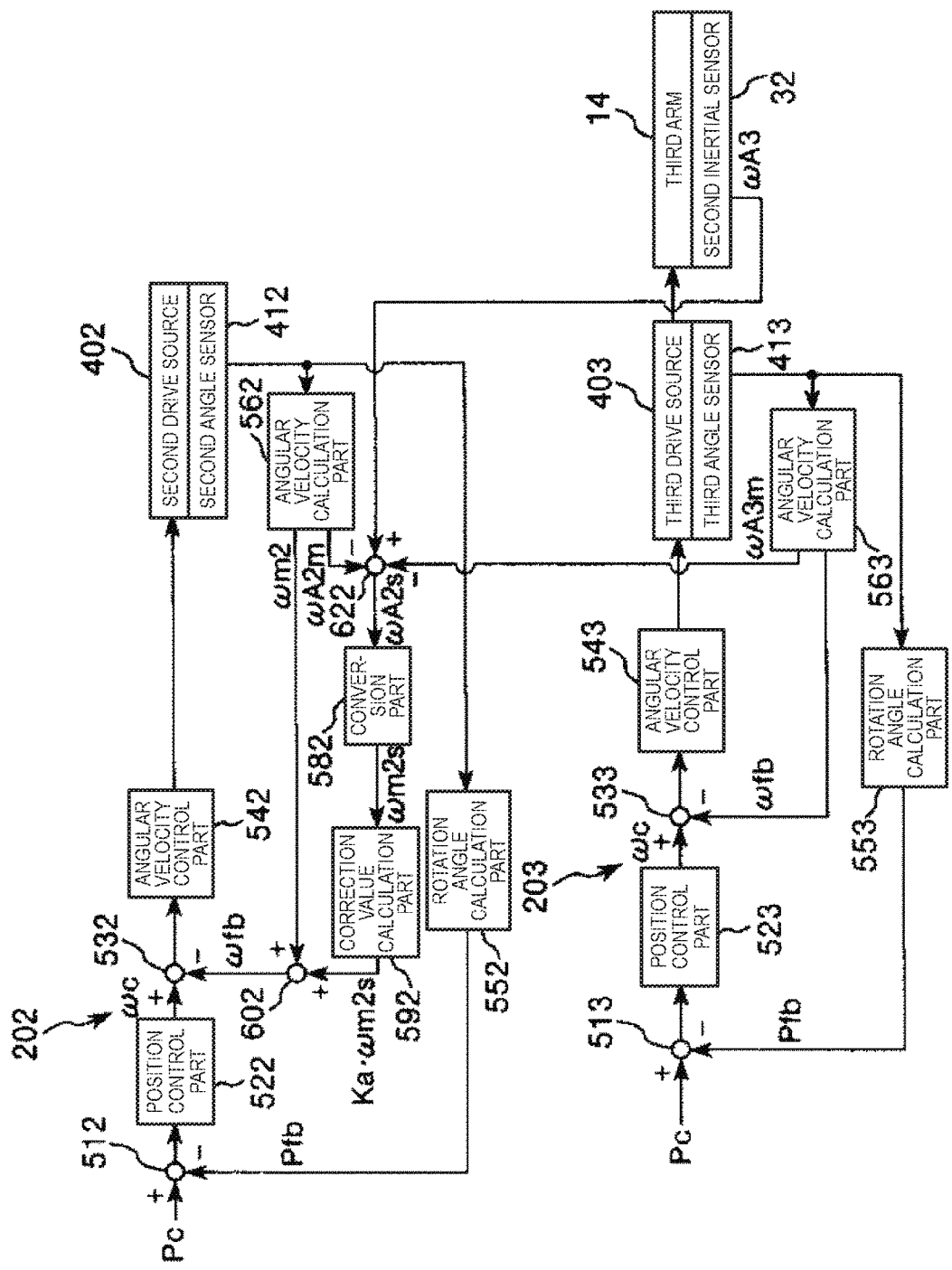
FIG. 9 is a block diagram of a main part of the robot system shown in FIG. 1.

As shown in FIG. 9, the second drive source control unit 202 has a subtractor 512, a position control part 522, a subtractor 532, an angular velocity control part 542, a rotation angle calculation part 552, an angular velocity calculation part 562, an adder-subtractor 622, a conversion part 582, a correction value calculation part 592, and an adder 602.

As shown in FIG. 9, the third drive source control unit 203 has a subtractor 513, a position control part 523, a subtractor 533, an angular velocity control part 543, a rotation angle calculation part 553, and an angular velocity calculation part 563.

Figure 10:
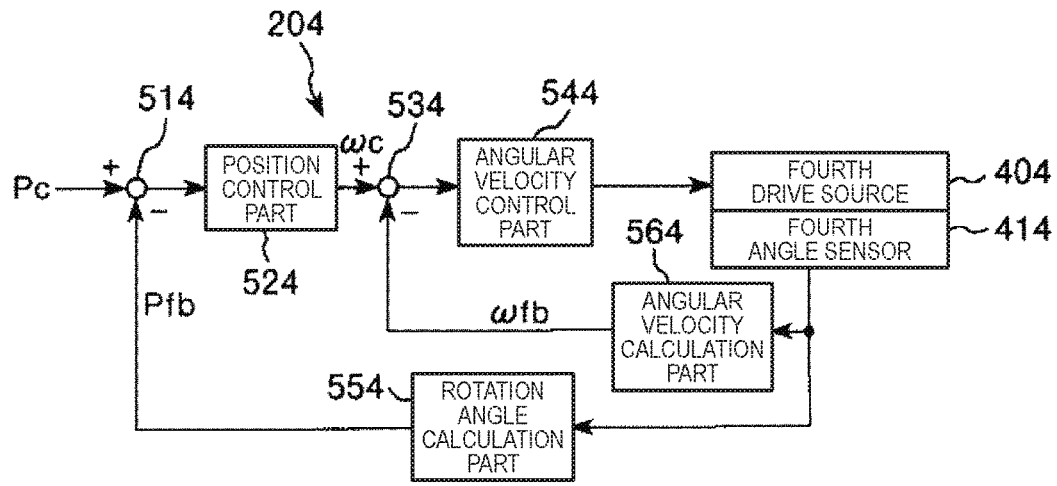
FIG. 10 is a block diagram of a main part of the robot system shown in FIG. 1.

As shown in FIG. 10, the fourth drive source control unit 204 has a subtractor 514, a position control part 524, a subtractor 534, an angular velocity control part 544, a rotation angle calculation part 554, and an angular velocity calculation part 564.

Figure 11:
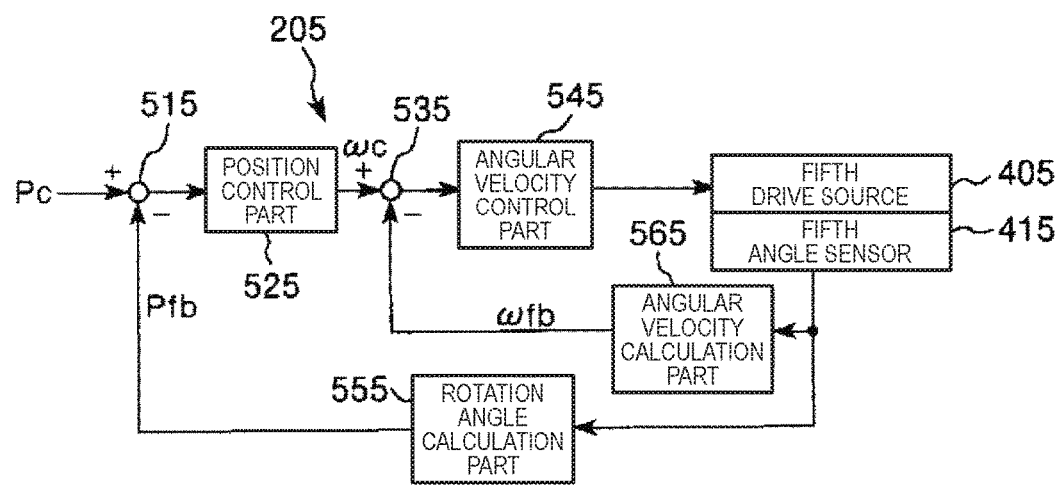
FIG. 11 is a block diagram of a main part of the robot system shown in FIG. 1.

As shown in FIG. 11, the fifth drive source control unit 205 has a subtractor 515, a position control part 525, a subtractor 535, an angular velocity control part 545, a rotation angle calculation part 555, and an angular velocity calculation part 565.

Figure 12:
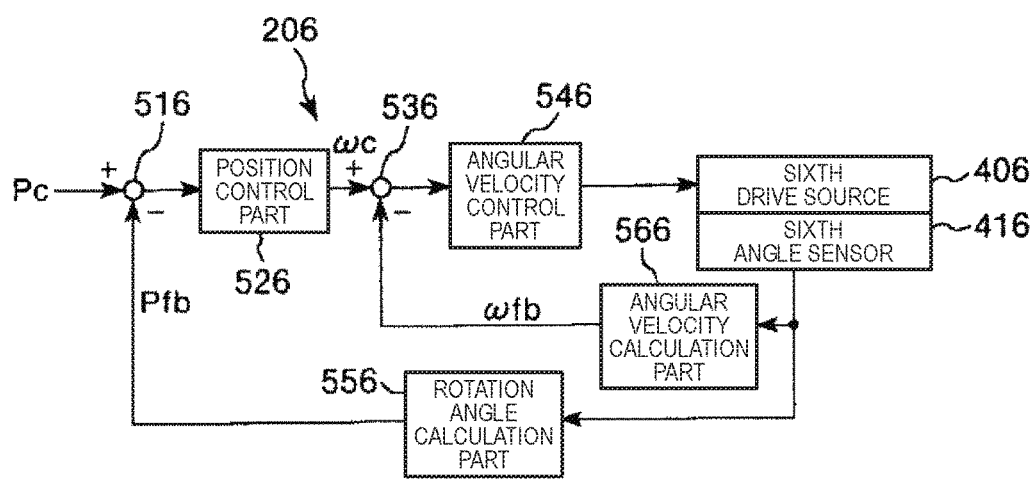
FIG. 12 is a block diagram of a main part of the robot system shown in FIG. 1.

As shown in FIG. 12, the sixth drive source control unit 206 has a subtractor 516, a position control part 526, a subtractor 536, an angular velocity control part 546, a rotation angle calculation part 556, and an angular velocity calculation part 566.

Here, the control apparatus 20 calculates a target position of the wrist 16 based on the details of the processing performed by the robot 1, and generates a trajectory for moving the wrist 16 to the target position. Then, the control apparatus 20 measures the rotation angles of the respective drive sources 401 to 406 with respect to each predetermined control period and outputs values calculated based on the measurement results to the drive source control parts 201 to 206 as position commands Pc of the respective drive sources 401 to 406, respectively, so that the wrist 16 may move along the generated trajectory (see FIGS. 8 to 12). Note that, in the above and following descriptions, the phrase "values are input and output" or the like means "signals corresponding to the values are input and output".

As shown in FIG. 8, to the first drive source control unit 201, in addition to the position command Pc of the first drive source 401, detection signals are respectively input from the first angle sensor 411 and the first inertial sensor 31. The first drive source control unit 201 drives the first drive source 401 by feedback control using the respective detection signals so that the rotation angle of the first drive source 401 (position feedback value Pfb) calculated from the detection signal of the first angle sensor 411 maybe the position command Pc and an angular velocity feedback value ωfb, which will be described later, may be an angular velocity command ωc, which will be described later.

That is, to the subtractor 511 of the first drive source control unit 201, the position command Pc is input and the position feedback value Pfb to be described later is input from the rotation angle calculation part 551. In the rotation angle calculation part 551, the number of pulse input from the first angle sensor 411 is counted and the rotation angle of the first drive source 401 according to the count value is output to the subtractor 511 as the position feedback value Pfb. The subtractor 511 outputs a deviation of the position feedback value Pfb from the position command Pc (a value obtained by subtraction of the position feedback value Pfb from the target value of the rotation angle of the first drive source 401) to the position control part 521.

The position control part 521 performs predetermined calculation processing using the deviation input from the subtractor 511 and proportional gain or the like as a predetermined coefficient, and thereby, calculates a target value of the angular velocity of the first drive source 401 according to the deviation. The position control part 521 outputs a signal representing the target value (command value) of the angular velocity of the first drive source 401 as the angular velocity command (first angular velocity command) ωc to the subtractor 531. Here, in the embodiment, proportional control (P-control) is performed as the feedback control, but not limited thereto.

To the subtractor 531, the angular velocity command ωc is input and the angular velocity feedback value ωfb to be described later is input. The subtractor 531 outputs a deviation of the angular velocity feedback value ωfb from the angular velocity command ωc (a value obtained by subtraction of the angular velocity feedback value ωfb from the target value of the angular velocity of the first drive source 401) to the angular velocity control part 541.

The angular velocity control part 541 performs predetermined calculation processing including integration using the deviation input from the subtractor 531 and proportional gain, integration gain, or the like as a predetermined coefficient, and thereby, generates a drive signal (drive current) of the first drive source 401 according to the deviation and supplies the signal to the motor 401M via the motor driver 301. Here, in the embodiment, PI-control is performed as the feedback control, but not limited thereto.

As described above, the feedback control is performed so that the position feedback value Pfb may be as equal as possible to the position command Pc and the angular velocity feedback value ωfb may be as equal as possible to the angular velocity command ωc, and the drive current of the first drive source 401 is controlled.

Next, the angular velocity feedback value ωfb in the first drive source control unit 201 will be explained.

In the angular velocity calculation part 561, an angular velocity ωm1 of the first drive source 401 is calculated based on the frequency of the pulse signal input from the first angle sensor 411, and the angular velocity ωm1 is output to the adder 601.

Further, in the angular velocity calculation part 561, an angular velocity ωA1m about the rotation shaft O1 of the first arm 12 is calculated based on the frequency of the pulse signal input from the first angle sensor 411, and the angular velocity ωA1m is output to the subtractor 571. Note that the angular velocity ωA1m is a value obtained by division of the angular velocity ω1m by a reduction ratio between the motor 401M of the first drive source 401 and the first arm 12, i.e., in the joint 171.

An angular velocity about the rotation shaft O1 of the first arm 12 is detected by the first inertial sensor 31. Then, the detection signal of the first inertial sensor 31, i.e., the angular velocity ωA1 about the rotation shaft O1 of the first arm 12 detected by the first inertial sensor 31 is output to the subtractor 571.

To the subtractor 571, the angular velocity ωA1 and the angular velocity ωA1m are input, and the subtractor 571 outputs a value ωA1s obtained by subtraction of the angular velocity ωA1m from the angular velocity ωA1 (=ωA1−ωA1m) to the conversion part 581. The value ωA1s corresponds to a vibration component (vibration angular velocity) of the angular velocity ωA1 about the rotation shaft O1 of the first arm 12. Hereinafter, ωA1s is referred to as "vibration angular velocity". In the embodiment, feedback control by which the vibration angular velocity ωA1s (In detail, an angular velocity ωm1s in the motor 401M as a value generated based on the vibration angular velocity ωA1s) is multiplied by gain Ka, which will be described later, and returns to the input side of the first drive source 401 is performed. Specifically, the feedback control is performed on the drive source 401 so that the vibration angular velocity ωA1s maybe as equal as possible to zero. Thereby, the vibration of the robot 1 may be suppressed. Note that, in the feedback control, the angular velocity of the first drive source 401 is controlled.

The conversion part 581 converts the vibration angular velocity ωA1s into the angular velocity ωm1s in the first drive source 401 and outputs the angular velocity ωm1s to the correction value calculation part 591. The conversion may be obtained by multiplication of the vibration angular velocity ωA1s by the reduction ratio between the motor 401M of the first drive source 401 and the first arm 12, i.e., in the joint 171.

The correction value calculation part 591 multiplies the angular velocity ωm1s by gain (feedback gain) Ka as a predetermined coefficient to obtain a correction value (first correction component) Ka·ωm1s, and outputs the correction value Ka·ωm1s to the adder 601.

To the adder 601, the angular velocity ωm1 is input and the correction value Ka·ωm1s is input. The adder 601 outputs an addition value of the angular velocity ωm1 and the correction value Ka·ωm1s as the angular velocity feedback value ωfb to the subtractor 531. The subsequent operations are as described above.

As shown in FIG. 9, to the second drive source control unit 202, in addition to the position command Pc of the second drive source 402, detection signals are respectively input from the second angle sensor 412 and the second inertial sensor 32. Further, to the second drive source control unit 202, an angular velocity ωA3m about the rotation shaft O3 of the third arm 14 is input from the third drive source control part 203. The second drive source control unit 202 drives the second drive source 402 by feedback control using the respective detection signals so that the rotation angle of the second drive source 402 (position feedback value Pfb) calculated from the detection signal of the second angle sensor 412 may be the position command Pc and an angular velocity feedback value ωfb, which will be described later, may be an angular velocity command ωc, which will be described later.

That is, to the subtractor 512 of the second drive source control unit 202, the position command Pc is input and the position feedback value Pfb to be described later is input from the rotation angle calculation part 552. In the rotation angle calculation part 552, the number of pulse input from the second angle sensor 412 is counted and the rotation angle of the second drive source 402 according to the count value is output to the subtractor 512 as the position feedback value Pfb. The subtractor 512 outputs a deviation of the position feedback value Pfb from the position command Pc (a value obtained by subtraction of the position feedback value Pfb from the target value of the rotation angle of the second drive source 402) to the position control part 522.

The position control part 522 performs predetermined calculation processing using the deviation input from the subtractor 512 and proportional gain or the like as a predetermined coefficient, and thereby, calculates a target value of the angular velocity of the second drive source 402 according to the deviation. The position control part 522 outputs a signal representing the target value (command value) of the angular velocity of the second drive source 402 as the angular velocity command (second angular velocity command) ωc to the subtractor 532. Here, in the embodiment, proportional control (P-control) is performed as the feedback control, but not limited thereto.

To the subtractor 532, the angular velocity command ωc is input and the angular velocity feedback value ωfb to be described later is input. The subtractor 532 outputs a deviation of the angular velocity feedback value ωfb from the angular velocity command ωc (a value obtained by subtraction of the angular velocity feedback value ωfb from the target value of the angular velocity of the second drive source 402) to the angular velocity control part 542.

The angular velocity control part 542 performs predetermined calculation processing including integration using the deviation input from the subtractor 532 and proportional gain, integration gain, or the like as a predetermined coefficient, and thereby, generates a drive signal (drive current) of the second drive source 402 according to the deviation and supplies the signal to the motor 402M via the motor driver 302. Here, in the embodiment, PI-control is performed as the feedback control, but not limited thereto.

As described above, the feedback control is performed so that the position feedback value Pfb may be as equal as possible to the position command Pc and the angular velocity feedback value ƒfb may be as equal as possible to the angular velocity command ωc, and the drive current of the second drive source 402 is controlled. Note that the rotation shaft O2 is orthogonal to the rotation shaft O1, and thereby, the operation of the second drive source 402 may be controlled independently from the first drive source 401 without being affected by the motion and the vibration of the first arm 12.

Next, the angular velocity feedback value ωfb in the second drive source control unit 202 will be explained.

In the angular velocity calculation part 562, an angular velocity ωm2 of the second drive source 402 is calculated based on the frequency of the pulse signal input from the second angle sensor 412, and the angular velocity ωm2 is output to the adder 602.

Further, in the angular velocity calculation part 562, an angular velocity ωA2m about the rotation shaft O2 of the second arm 13 is calculated based on the frequency of the pulse signal input from the second angle sensor 412, and the angular velocity ωA2m is output to the adder 622. Note that the angular velocity ωA2m is a value obtained by division of the angular velocity ωm2 by a reduction ratio between the motor 402M of the second drive source 402 and the second arm 13, i.e., in the joint 172.

An angular velocity about the rotation shaft O2 of the third arm 14 is detected by the second inertial sensor 32. Then, the detection signal of the second inertial sensor 32, i.e., an angular velocity ωA3 about the rotation shaft O2 of the third arm 14 detected by the second inertial sensor 32 is output to the adder-subtractor 622. Note that the rotation shafts O2, O3 are orthogonal to the rotation shaft O1, and thereby, the angular velocity about the rotation shaft O2 of the third arm 14 may be obtained easily and reliably without being affected by the motion and the vibration of the first arm 12.

Further, from the angular velocity calculation part 563 of the third drive source control unit 203, which will be described later, an angular velocity ωA3m about the rotation shaft O3 of the third arm 14 is output to the adder-subtractor 622.

To the adder-subtractor 622, the angular velocity ωA3, the angular velocity ωA2m, and the angular velocity ωA3m are input, and the adder-subtractor 622 outputs a value ωA2s obtained by subtraction of the angular velocity ωA2m and the angular velocity ωA3m from the angular velocity ωA3 (=ωA3−ωA2m−ωA3m) to the conversion part 582. The value ωA2s corresponds to a vibration component (vibration angular velocity) of the total angular velocity about the rotation shaft O2 of the second arm 13 and the third arm 14. Hereinafter, ωA2s is referred to as "vibration angular velocity". In the embodiment, feedback control by which the vibration angular velocity ωA2s (in detail, the angular velocity ωm2s in the motor 402M as the value generated based on the vibration angular velocity ωA2s) is multiplied by gain Ka, which will be described later, and returns to the input side of the second drive source 402 is performed. Specifically, the feedback control is performed on the drive source 402 so that the vibration angular velocity ωA2s may be as equal as possible to zero. Thereby, the vibration of the robot 1 may be suppressed. Note that, in the feedback control, the angular velocity of the second drive source 402 is controlled.

The conversion part 582 converts the vibration angular velocity ωA2s into the angular velocity ωm2s in the second drive source 402 and outputs the angular velocity ωm2s to the correction value calculation part 592. The conversion may be obtained by multiplication of the vibration angular velocity ωA2s by the reduction ratio between the motor 402M of the second drive source 402 and the second arm 13, i.e., in the joint 172.

The correction value calculation part 592 multiplies the angular velocity ωm2s by gain (feedback gain) Ka as a predetermined coefficient to obtain a correction value (second correction component) Ka·ωm2s, and outputs the correction value Ka·ωm2s to the adder 602. Note that the gain Ka in the second drive source control unit 202 and the gain Ka in the first drive source control unit 201 may be the same or not.

To the adder 602, the angular velocity ωm2 is input and the correction value Ka·ωm2s is input. The adder 602 outputs an addition value of the angular velocity ωm2 and the correction value Ka·ωm2s as the angular velocity feedback value ωfb to the subtractor 532. The subsequent operations are as described above.

As shown in FIG. 9, to the third drive source control unit 203, in addition to the position command Pc of the third drive source 403, a detection signal is input from the third angle sensor 413. The third drive source control unit 203 drives the third drive source 403 by feedback control using the respective detection signals so that the rotation angle of the third drive source 403 (position feedback value Pfb) calculated from the detection signal of the third angle sensor 413 may be the position command Pc and an angular velocity feedback value ωfb, which will be described later, may be an angular velocity command ωc, which will be described later.

That is, to the subtractor 513 of the third drive source control unit 203, the position command Pc is input and the position feedback value Pfb to be described later is input from the rotation angle calculation part 553. In the rotation angle calculation part 553, the number of pulse input from the third angle sensor 413 is counted and the rotation angle of the third drive source 403 according to the count value is output to the subtractor 513 as the position feedback value Pfb. The subtractor 513 outputs a deviation of the position feedback value Pfb from the position command Pc (a value obtained by subtraction of the position feedback value Pfb from the target value of the rotation angle of the third drive source 403) to the position control part 523.

The position control part 523 performs predetermined calculation processing using the deviation input from the subtractor 511 and proportional gain or the like as a predetermined coefficient, and thereby, calculates a target value of the angular velocity of the third drive source 403 according to the deviation. The position control part 523 outputs a signal representing the target value (command value) of the angular velocity of the third drive source 403 as the angular velocity command ωc to the subtractor 533. Here, in the embodiment, proportional control (P-control) is performed as the feedback control, but not limited thereto.

In the angular velocity calculation part 563, the angular velocity of the third drive source 403 is calculated based on the frequency of the pulse signal input from the third angle sensor 413, and the angular velocity is output as the angular velocity feedback value ωfb to the subtractor 533.

To the subtractor 533, the angular velocity command ωc is input and the angular velocity feedback value ωfb is input. The subtractor 533 outputs a deviation of the angular velocity feedback value ωfb from the angular velocity command ωc (a value obtained by subtraction of the angular velocity feedback value ωfb from the target value of the angular velocity of the third drive source 403) to the angular velocity control part 543.

The angular velocity control part 543 performs predetermined calculation processing including integration using the deviation input from the subtractor 533 and proportional gain, integration gain, or the like as a predetermined coefficient, and thereby, generates a drive signal (drive current) of the third drive source 403 according to the deviation and supplies the signal to the motor 403M via the motor driver 303. Here, in the embodiment, PI-control is performed as the feedback control, but not limited thereto.

As described above, the feedback control is performed so that the position feedback value Pfb may be as equal as possible to the position command Pc and the angular velocity feedback value ωfb may be as equal as possible to the angular velocity command ωc, and the drive current of the third drive source 403 is controlled.

The drive source control units 204 to 206 are respectively the same as the third drive source control unit 203, and their explanation will be omitted.

Here, in the robot system 100, the above described feedback gain (weighting value) or the like is adjusted with respect to the first arm 12 (first drive source 401) and the second arm 13 (second drive source 402).

First, regarding the first arm 12, the angular acceleration (acceleration) about the first rotation shaft O1 of the first arm 12 is adjusted according to the attitude of the robot 1 (robot arm 10), i.e., the moment of inertia with respect to the first rotation shaft O1. When the moment of inertia is larger, the angular acceleration is smaller, and, when the moment of inertia is smaller, the angular acceleration is larger.

Further, the feedback gain with respect to the first arm 12 is adjusted according to the moment of inertia. When the moment of inertia is larger (see FIG. 4), the feedback gain is larger, and, when the moment of inertia is smaller (see FIG. 5), the feedback gain is smaller.

This is because there are the following tendencies. First, when the moment of inertia is larger, the vibration of the robot 1 is larger and, even when the feedback gain is made larger, the robot 1 is harder to oscillate. Accordingly, the vibration suppression effect is improved by increasing the feedback gain. Further, when the moment of inertia is larger, the larger drive force is required, and the angular acceleration is made smaller.

When the moment of inertia is smaller, the vibration of the robot 1 is smaller and, when the feedback gain is made larger, the robot 1 is easier to oscillate. Accordingly, the oscillation of the robot 1 is suppressed by decreasing the feedback gain. Further, when the moment of inertia is smaller, the required drive force is smaller, and the angular acceleration is made larger.

The moment of inertia corresponds to a rotation angle O1 about the second rotation shaft O2 of the second arm 13 (see FIG. 4). Accordingly, in the actual control of the robot 1, for example, the rotation angle θ1 is detected and the angular acceleration about the first rotation shaft O1 of the first arm 12 and the feedback gain with respect to the first arm 12 are obtained based on the detection result. In other words, the feedback gain is obtained based on the angular acceleration. That is, the feedback gain changes according to the angular acceleration. The rotation angle θ1 may be obtained based on the detection result of the second angle sensor 412.

Calculation expressions or calibration curves such as tables showing relationships among the rotation angle θ1, the angular acceleration about the first rotation shaft O1 of the first arm 12, and the feedback gain with respect to the first arm 12 are experimentally obtained in advance and stored in a memory unit (not shown) of the control apparatus 20. When the robot 1 is operated, the feedback gain is determined using the calibration curves. That is, during the operation of the robot 1, the feedback gain is sequentially adjusted (changed) using the calibration curves.

Figure 5:
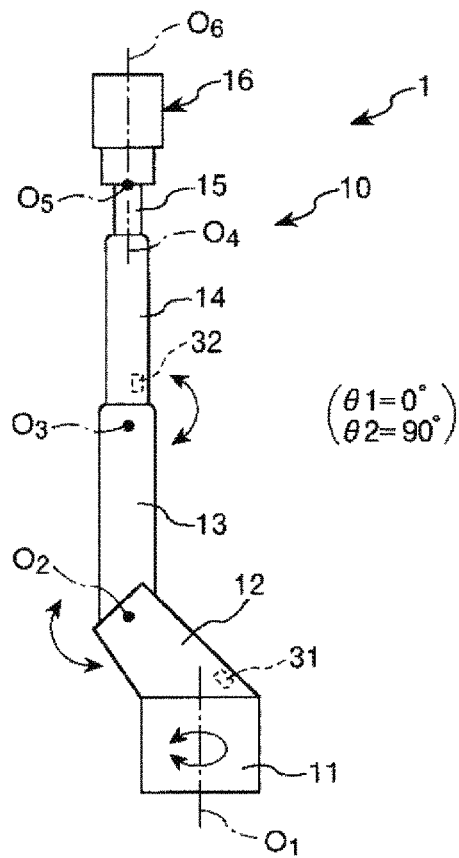
FIG. 5 is a schematic diagram of the robot of the robot system shown in FIG. 1.

Note that the rotation angle θ1 (see FIG. 4) is 0° when the attitude of the second arm 13 relative to the first arm 12 is the attitude shown in FIG. 5, in other words, when the second arm 13 extends upward in the vertical direction and the center axis of the second arm 13 is parallel to the vertical direction, and −90° when the attitude of the second arm 13 relative to the first arm 12 is the attitude shown in FIG. 4, in other words, when the second arm 13 extends to the left in FIG. 4 and the center axis of the second arm 13 is parallel to the horizontal direction.

Further, the adjustment of the above described feedback gain is performed on the second arm 13 (second drive source 402) like the first arm 12.

First, regarding the second arm 13, the angular acceleration (acceleration) about the second rotation shaft O2 of the second arm 13 is adjusted according to the attitude of the robot 1 (robot arm 10), i.e., the moment of inertia with respect to the second rotation shaft O2. When the moment of inertia is larger, the angular acceleration is smaller, and, when the moment of inertia is smaller, the angular acceleration is larger.

Furthermore, the feedback gain with respect to the second arm 13 is adjusted according to the moment of inertia. When the moment of inertia is larger (see FIGS. 4 and 5), the feedback gain is larger, and, when the moment of inertia is smaller (see FIG. 6), the feedback gain is smaller.

The moment of inertia corresponds to a rotation angle θ2 about the third rotation shaft O3 of the third arm 14 (see FIG. 4). Accordingly, in the actual control of the robot 1, for example, the rotation angle θ2 is detected and the angular acceleration about the second rotation shaft O2 of the second arm 13 and the feedback gain with respect to the second arm 13 are obtained based on the detection result. In other words, the feedback gain is obtained based on the angular acceleration. That is, the feedback gain changes according to the angular acceleration. The rotation angle θ2 may be obtained based on the detection result of the third angle sensor 413.

Calculation expressions or calibration curves such as tables showing the relationships among the rotation angle θ2, the angular acceleration about the second rotation shaft O2 of the second arm 13, and the feedback gain with respect to the second arm 13 are experimentally obtained in advance and stored in the memory unit (not shown) of the control apparatus 20. When the robot 1 is operated, the feedback gain is determined using the calibration curves. That is, during the operation of the robot 1, the feedback gain is sequentially adjusted (changed) using the calibration curves.

Figure 6:
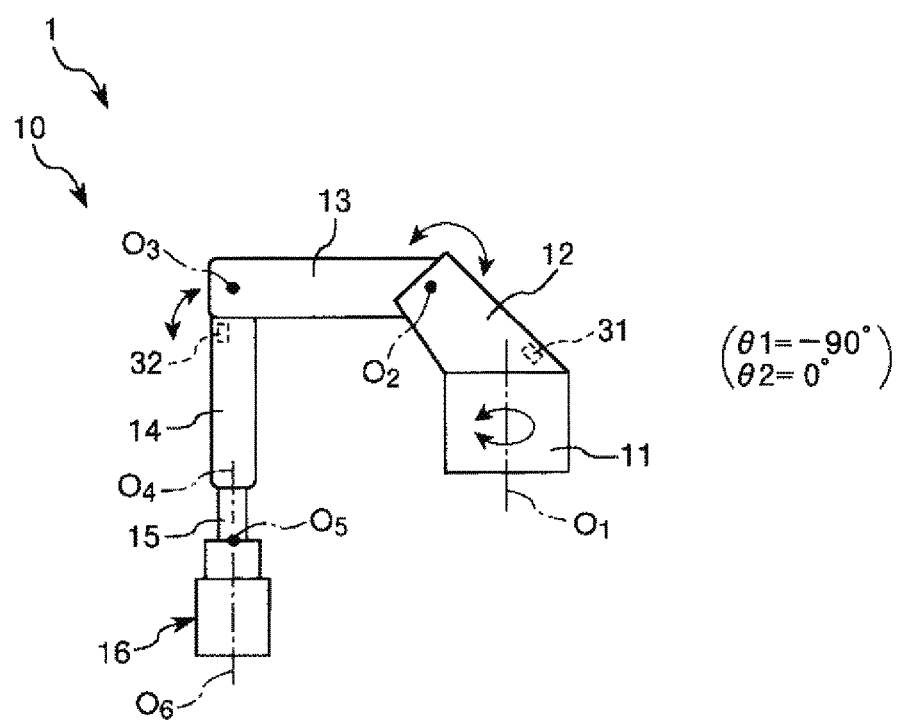
FIG. 6 is a schematic diagram of the robot of the robot system shown in FIG. 1.

Note that the rotation angle θ2 (see FIG. 4) is 0° when the attitude of the third arm 14 relative to the second arm 13 is the attitude shown in FIG. 6, in other words, when the second arm 13 extends to the left in the horizontal direction as shown in FIG. 6, the third arm 14 extends downward in the vertical direction, and the center axis of the third arm 14 is in parallel to the vertical direction, and 90° when the attitude of the third arm 14 relative to the second arm 13 is the attitude shown in FIG. 4, in other words, when the second arm 13 extends to the left in the horizontal direction as shown in FIG. 4, the second arm 13 extends to the left in FIG. 4, and the center axis of the second arm 13 is in parallel to the horizontal direction. In the attitude of the third arm 14 shown in FIG. 5, the rotation angle θ2 is 90°.

Regarding the first arm 12, the cases are divided into the case where load on (provided on) the distal end part of the wrist 16 of the robot 1 is equal to or more than a predetermined threshold value and the case where the load is less than the threshold value, calibration curves used when the feedback gain is set are separately set for the cases where the load is equal to or more than the threshold value and the load is less than the threshold value. That is, the calibration curve when the load is equal to or more than the threshold value and the calibration curve when the load is less than the threshold value are different.

This is because, when the load is larger, the larger vibration is generated due to bending of a predetermined arm compared to the case where the load is smaller, and it is necessary to suppress the bending of the arm and suppress the vibration. For example, the robot 1 may vibrate due to curving of the root of the first arm 12 in the attitude of the robot arm 10 shown in FIG. 4. Accordingly, as the attitude of the robot arm 10 is closer to the attitude shown in FIG. 4, the angular acceleration about the first rotation shaft O1 of the first arm 12 is made smaller.

The threshold value is not particularly limited, but appropriately set according to dimensions, characteristics, performances, etc. of the robot 1, and preferably set to a value within a range from 1 kg to 6 kg, more preferably set to a value within a range from 2 kg to 4 kg, and is set to 3 kg, for example.

Note that the adjustment of the feedback gain with respect to the above described first arm 12 is for the case where the load is less than the threshold value. The adjustment of the feedback gain with respect to the first arm 12 when the load is equal to or more than the threshold value will be explained in the following specific examples.

As below, as examples, configuration examples of calibration curves when the robot 1 has the following respective dimensions are shown in FIGS. 13 to 15 and the adjustment of the feedback gain will be explained based on FIGS. 13 to 15.

In the following explanation, the feedback gain is expressed by a relative value with the maximum value as one, however, the feedback gain may be expressed by an absolute value.

Maximum Load: 8 kg
Rated Load: 3 kg
Maximum Length L1: 980 mm
Maximum Length L2: 880 mm
Mass M1 of Robot Arm 10: 37 kg
Total Mass M2 of Second Arm 13 to Wrist 16: 23 kg
Maximum Value of Moment of Inertia with respect to First Rotation Shaft O1: 9.5 kg·m$^2$
Maximum Value of Moment of Inertia with respect to Second Rotation Shaft O2: 6.8 kg·m$^2$
Cycle Time (Load: 2 kg): 0.35 seconds FIGS. 13 and 14 respectively show the calibration curves used when the feedback gain "Ka" in the correction value "Ka·ω m1s" and the angular acceleration of the first arm 12 are adjusted. The calibration curves shown in FIG. 13 are the calibration curves when the load is less than the threshold value, and the calibration curves shown in FIG. 14 are the calibration curves when the load is equal to or more than the threshold value.

Further, the lateral axes of the graphs shown in FIGS. 13 and 14 indicate the rotation angle θ1 of the second arm 13 and the longitudinal axes indicate the angular acceleration about the first rotation shaft O1 of the first arm 12 and the feedback gain with respect to the first arm 12.

As shown in FIG. 13, when the load provided in the robot arm 10 is less than the threshold value, in at least a part of the range in which the robot arm 10 is movable, i.e., at least a part of the range in which the second arm 13 is rotatable, the feedback gain takes a first value when the angular acceleration of the first arm 12 (the acceleration of the robot arm 10) is first angular acceleration (first acceleration), and, if the angular acceleration of the first arm 12 changes from the first angular acceleration to second angular acceleration (second acceleration) lower than the first angular acceleration, changes from the first value to a second value higher than the first value. Thereby, the effect of suppressing the vibration of the robot 1 may be improved.

As a specific example, when the rotation angle θ1 is 0°, the angular acceleration of the first arm 12 is 87.5 rad/s$^2$ and the feedback gain is 0.73 (first value), and, when the rotation angle θ1 is −90°, the angular acceleration of the first arm 12 is 36.8 rad/s$^2$ and the feedback gain is "1" (second value).

Further, as shown in FIG. 14, when the load provided in the robot arm 10 is equal to or more than the threshold value, in at least a part of the range in which the robot arm 10 is movable, i.e., at least a part of the range in which the second arm 13 is rotatable, the angular acceleration of the first arm 12 (the acceleration of the robot arm 10) is lower than the angular acceleration of the first arm 12 when the load is less than the threshold value. Thereby, curving of the robot arm 10 in the root may be suppressed and the vibration of the robot 1 may be suppressed.

As a specific example, when the rotation angle θ1 is larger than −90°, the angular acceleration of the first arm 12 when the load is equal to or more than the threshold value is lower than the angular acceleration of the first arm 12 when the load is less than the threshold value.

FIG. 15 shows the calibration curves used when the feedback gain "Ka" in the above described correction value "Ka·ωm2s" of the second arm 13 and the angular acceleration of the second arm 13 are adjusted.

The lateral axis of the graph shown in FIG. 15 indicates the rotation angle θ2 of the third arm 14 and the longitudinal axis indicates the angular acceleration about the second rotation shaft O2 of the second arm 13 and the feedback gain with respect to the second arm 13.

As shown in FIG. 15, in at least a part of the range in which the robot arm 10 is movable, i.e., in at least a part of the range in which the third arm 14 is rotatable, the feedback gain takes a first value when the angular acceleration of the second arm 13 (the acceleration of the robot arm 10) is first angular acceleration (first acceleration), and, if the angular acceleration of the second arm 13 changes from the first angular acceleration to the second angular acceleration (second acceleration) lower than the first angular acceleration, changes from the first value to a second value higher than the first value.

As a specific example, when the rotation angle θ2 is −55°, the angular acceleration of the second arm 13 is 70.0 rad/s$^2$ and the feedback gain is 0.67 (first value), and, when the rotation angle θ1 is 0°, the angular acceleration of the second arm 13 is 32.8 rad/s$^2$ and the feedback gain is "1" (second value).

As described above, according to the robot system 100 (robot 1), the vibration of the robot 1 may be suppressed and the adjustment of the feedback gain with respect to the first arm 12 and the second arm 13 is performed in the above described manner, and thereby, the effect of suppressing the vibration of the robot 1 (vibration suppression effect) may be easily improved.

Further, the control of suppressing the vibration is performed on the second drive source 402 that drives the second arm 13 using the detection result of the second inertial sensor 32 provided in the third arm 14 at the distal end side at which the larger vibration is generated than that in the second arm 13, and thereby, the effect of suppressing the vibration of the robot 1 may be improved. Furthermore, the operation of the second drive source 402 that rotates the second arm 13 closer to the proximal end side than the third arm 14 is controlled, and thereby, the effect of suppressing the vibration of the robot 1 may be improved.

The inertial sensors 31, 32 are provided in the first arm 12 and the third arm 14, respectively, and the first rotation shaft O1 for the rotation of the first arm 12 is made orthogonal to the second rotation shaft O2 for the rotation of the second arm 13 and the third rotation shaft O3 for the rotation of the third arm 14, and thereby, the angular velocities of the first arm 12 and the third arm 14 may be detected as simple rotation components without mixture with each other. Then, the control by the calculation using the components is performed, and thereby, the vibration of the robot 1 may be suppressed more easily, more accurately, and more appropriately.

The first rotation shaft O1 for the rotation of the first arm 12 is made orthogonal to the second rotation shaft O2 for the rotation of the second arm 13 and the third rotation shaft O3 for the rotation of the third arm 14, and thereby, the angular velocities of the first arm 12 and the third arm 14 may be detected as simple rotation components without mixture with each other. The rotation components without mixture are multiplied by the feedback gain, and thereby, the rotation components may be respectively corrected with higher accuracy.

As above, the robot, the control apparatus, and the robot system according to the invention are explained based on the illustrated embodiments, however, the invention is not limited to those. The configurations of the respective parts may be replaced by arbitrary configurations having the same functions. Further, other arbitrary configurations may be added.

In the above described embodiments, the adjustment of the feedback gain (weighting values) is performed on the second arm (second drive source) and the third arm (third drive source), however, the invention is not limited to that. The arm (drive source) for which the adjustment of the feedback gain is performed may be any one of the second arm and the third arm or another arm. That is, it is only necessary that the adjustment of the feedback gain is performed on at least one of the respective arms of the robot.

Further, in the invention, the respective motors include e.g. stepping motors, not limited to the above described servo motors.

In the above described embodiments, the encoders are respectively used for the respective angle sensors, however, the invention is not limited to those. For example, various other sensors that detect the rotation angles of the rotors of the motors and rotation shafts (rotating shafts) of the reducers including resolvers and potentiometers may be used and various sensors that detect the rotation velocities of the rotors of the motors and rotation shafts of the reducers including tacho generators may be used. When the stepping motors are used as the motors, for example, the rotation angles and the rotation velocities of the rotors of the motors may be detected by measurement of the numbers of drive pulse input to the stepping motors.

In the above described embodiments, the angular velocity sensors (gyro sensors) are used as the respective inertial sensors, however, the invention is not limited to those. For example, various acceleration sensors that detect acceleration of the arms or the like may be used. When the acceleration sensors are used, the angular velocities are calculated using the detection values of the acceleration sensors.

The respective angle sensors and the respective inertial sensors include, but not particularly limited to, e.g., optical, magnetic, electromagnetic, electrical sensors.

In the above described embodiments, the number of rotation shafts of the robot is six, however, the invention is not limited to that. The number of rotation shafts of the robot may be e.g. two, three, four, five, or seven or more.

That is, in the above described embodiments, the wrist has two arms and the number of arms of the robot is six, however, the invention is not limited to that. The number of arms of the robot may be two, three, four, five, or seven or more.

Further, in the above described embodiments, the robot is the single-arm robot including one robot arm having a plurality of rotatable arms, however, the invention is not limited to that. For example, the robot may be a robot including a plurality of robot arms such as a dual-arm robot including two robot arms, for example.

Furthermore, in the above described embodiments, the hand is taken as an example as the end effector, however, the invention is not limited to that. In addition, as the end effector, for example, a drill, a welding machine, a laser irradiation machine, etc. may be employed.

In the above described embodiments, the location where the base of the robot is fixed is a floor, however, the invention is not limited to that. In addition, for example, a ceiling, a wall, a workbench, the ground in the installation space may be employed. Further, the robot may be installed within a cell. In this case, the location where the base is fixed is not particularly limited, but may be e.g. a ceiling part, a wall part, a workbench of the cell or the like.

In the above described embodiments, the location where the robot (base) is fixed is a plane (surface) in parallel to the horizontal plane, however, the invention is not limited to that. For example, a plane (surface) inclined with respect to the horizontal plane and the vertical plane may be employed or a plane (surface) in parallel to the vertical plane may be employed. That is, the first rotation shaft may be inclined with respect to the vertical direction and the horizontal direction or parallel to the horizontal direction.

In the invention, the robot maybe a robot of another type. A specific example includes e.g. a legged walking (mobile) robot having leg parts.

The entire disclosure of Japanese Patent Application No. 2015-148095, filed Jul. 27, 2015 is expressly incorporated by reference herein.

What is claimed is:

1. A robot comprising:
a robot arm; and
an inertial sensor provided in the robot arm,
wherein the robot arm is controlled using a weighting value for weighting output from the inertial sensor, and
in at least a part of a range in which the robot arm is movable, the weighting value is a first value when an acceleration of the robot arm is a first acceleration, and changes from the first value to a second value higher than the first value when the acceleration of the robot arm changes from the first acceleration to a second acceleration which is lower than the first acceleration.

2. The robot according to claim 1,
wherein the robot arm is provided on a base and has a first arm rotatable about a first rotation shaft and a second arm rotatable about a second rotation shaft in an axis direction different from an axis direction of the first rotation shaft, and
a maximum length between the first rotation shaft and a distal end of the robot arm is equal to or more than 970 mm.

3. The robot according to claim 1,
wherein a mass of the robot arm is equal to or more than 30 kg.

4. The robot according to claim 1,
wherein maximum load provided in the robot arm exceeds 5 kg.

5. The robot according to claim 1,
wherein, in at least a part of the range in which the robot arm is movable, the acceleration of the robot arm when a load provided in the robot arm is equal to or more than a predetermined threshold value is lower than the acceleration of the robot arm when the load is less than the threshold value.

6. The robot according to claim 1,
wherein the weighting value changes according to the acceleration of the robot arm.

7. The robot according to claim 1,
wherein the robot arm has a rotatable arm, and
the acceleration of the robot arm is an angular acceleration of the arm.

8. The robot according to claim 1,
wherein the robot arm has a rotatable arm, and
the range in which the robot arm is movable is a range in which the arm is rotatable.

9. The robot according to claim 1,
wherein the robot arm is provided on a base and has a first arm rotatable about a first rotation shaft, a second arm rotatable about a second rotation shaft in an axis direction different from an axis direction of the first rotation shaft, a first reducer that decelerates driving of the first arm, and a second reducer that decelerates driving of the second arm, and
rigidity of the first reducer and rigidity of the second reducer are equal to or more than 40000Nm/rad.

10. A control apparatus controlling the robot according to claim 1.

11. A control apparatus controlling the robot according to claim 2.

12. A control apparatus controlling the robot according to claim 3.

13. A control apparatus controlling the robot according to claim 4.

14. A control apparatus controlling the robot according to claim 5.

15. A control apparatus controlling the robot according to claim 6.

16. A robot system comprising:
the robot according to claim 1; and
a control apparatus controlling the robot.

17. A robot system comprising:
the robot according to claim 2; and
a control apparatus controlling the robot.

18. A robot system comprising:
the robot according to claim 3; and
a control apparatus controlling the robot.

19. A robot system comprising:
the robot according to claim 4; and
a control apparatus controlling the robot.

20. A robot system comprising:
the robot according to claim 5; and
a control apparatus controlling the robot.

* * * * *